United States Patent
Connors et al.

(10) Patent No.: US 8,711,833 B2
(45) Date of Patent: Apr. 29, 2014

(54) BASE STATION SYNCHRONIZATION FOR A SINGLE FREQUENCY NETWORK

(75) Inventors: Dennis P. Connors, San Diego, CA (US); Huei-Jiun Ju, San Diego, CA (US); Keerthi S. Govind, San Diego, CA (US); Sina Zahedi, San Diego, CA (US)

(73) Assignee: Wi-LAN, Inc., Ottawa (CA)

( * ) Notice: Subject to any disclaimer, the term of this patent is extended or adjusted under 35 U.S.C. 154(b) by 842 days.

(21) Appl. No.: 12/104,299

(22) Filed: Apr. 16, 2008

(65) Prior Publication Data

US 2008/0259905 A1    Oct. 23, 2008

Related U.S. Application Data

(60) Provisional application No. 60/912,661, filed on Apr. 18, 2007, provisional application No. 60/953,452, filed on Aug. 1, 2007, provisional application No. 60/971,837, filed on Sep. 12, 2007.

(51) Int. Cl.
*H04J 3/06* (2006.01)

(52) U.S. Cl.
USPC .......................................................... 370/350

(58) Field of Classification Search
USPC ........ 370/203, 310–338, 395.2, 395.3, 395.4, 370/412–421, 422–429, 431–448, 458–463, 370/464–488, 503–520
See application file for complete search history.

(56) References Cited

U.S. PATENT DOCUMENTS

| | | |
|---|---|---|
| 5,452,288 A | 9/1995 | Rahuel et al. |
| 5,544,198 A | 8/1996 | Saalfrank et al. |
| 5,659,685 A | 8/1997 | Williams et al. |
| 5,740,534 A | 4/1998 | Ayerst et al. |
| 5,828,659 A | 10/1998 | Teder et al. |
| 5,867,791 A | 2/1999 | Chambert |
| 5,892,910 A | 4/1999 | Safadi |

(Continued)

FOREIGN PATENT DOCUMENTS

| | | |
|---|---|---|
| EP | 1 237 371 | 9/2002 |
| EP | 1237371 | 9/2002 |

(Continued)

OTHER PUBLICATIONS

Digital Video Broadcasting (DVB); Transmission System for Handheld Terminals (DVB-H), ETSI EN 302 304 V1.1.1 (Nov. 2004).

(Continued)

*Primary Examiner* — Jung-Jen Liu
(74) *Attorney, Agent, or Firm* — Volpe and Koenig, P.C.

(57) ABSTRACT

Methods, apparatus and systems for generating and synchronizing a macro-diversity region transmitted by base stations in a network includes a receiving module configured to receive a plurality of packets of content data. A controller module coupled to the receiving module and configured to generate a macro-diversity region data that includes at least one packet of the plurality of packets of content data, and to generate a time reference and frame offset information to indicate an offset from the time reference and to further identify a second base station transmission frame that will include the second macro-diversity region data. A communication module to communicate a macro-diversity region message that includes the macro-diversity region data and the macro-diversity region control information to a plurality of base stations, configured to synchronize the transmission of the macro-diversity region data at the plurality of base stations.

20 Claims, 12 Drawing Sheets

(56) References Cited

U.S. PATENT DOCUMENTS

| | | | |
|---|---|---|---|
| 6,009,325 A | 12/1999 | Retzer et al. | |
| 6,112,100 A | 8/2000 | Ossoinig et al. | |
| 6,172,988 B1 | 1/2001 | Tiernan et al. | |
| 6,192,038 B1 | 2/2001 | Wallerius et al. | |
| 6,212,190 B1 | 4/2001 | Mulligan et al. | |
| 6,502,131 B1 | 12/2002 | Vaid et al. | |
| 6,504,830 B1 | 1/2003 | Ostberg et al. | |
| 6,628,638 B1 | 9/2003 | Sato et al. | |
| 6,721,797 B1 | 4/2004 | Kim | |
| 6,847,826 B1 | 1/2005 | Wesby et al. | |
| 6,898,640 B1 | 5/2005 | Kurita et al. | |
| 7,035,215 B1 | 4/2006 | Engdahl | |
| 7,058,407 B2 | 6/2006 | Chi et al. | |
| 7,099,348 B1 | 8/2006 | Warwick et al. | |
| 7,107,061 B1 | 9/2006 | Tontiruttananon et al. | |
| 7,242,960 B2 | 7/2007 | Van Rooyen | |
| 7,283,817 B2 | 10/2007 | Salo et al. | |
| 7,301,905 B1 | 11/2007 | Tontiruttananon et al. | |
| 7,324,832 B2 | 1/2008 | Van Rooyen | |
| 7,333,829 B2 | 2/2008 | Malone et al. | |
| 7,362,735 B2 | 4/2008 | Mantha | |
| 7,421,244 B2 | 9/2008 | Van Rooyen | |
| 7,450,899 B2 | 11/2008 | Roberts et al. | |
| 7,469,413 B1 | 12/2008 | Mizutome et al. | |
| 7,522,536 B2 | 4/2009 | Roberts et al. | |
| 7,593,738 B2 * | 9/2009 | Anderson | 455/456.1 |
| 7,599,327 B2 * | 10/2009 | Zhuang | 370/329 |
| 7,613,104 B2 * | 11/2009 | Bhatt et al. | 370/208 |
| 7,768,966 B2 * | 8/2010 | Yoon et al. | 370/329 |
| 2001/0030956 A1 | 10/2001 | Chillariga et al. | |
| 2001/0046240 A1 * | 11/2001 | Longoni et al. | 370/503 |
| 2002/0061012 A1 | 5/2002 | Thi et al. | |
| 2002/0086691 A1 | 7/2002 | Kostic et al. | |
| 2002/0138560 A1 | 9/2002 | Aaltonen et al. | |
| 2002/0160784 A1 | 10/2002 | Kuwahara | |
| 2002/0167962 A1 | 11/2002 | Kowalski | |
| 2003/0002474 A1 | 1/2003 | Alexander et al. | |
| 2003/0072255 A1 | 4/2003 | Ma et al. | |
| 2003/0095513 A1 | 5/2003 | Woodmansee et al. | |
| 2004/0017777 A1 | 1/2004 | Chaudhuri et al. | |
| 2004/0141502 A1 | 7/2004 | Corson et al. | |
| 2004/0153767 A1 | 8/2004 | Dolgonos | |
| 2004/0223449 A1 | 11/2004 | Tsuie et al. | |
| 2004/0229624 A1 | 11/2004 | Cai et al. | |
| 2005/0090235 A1 | 4/2005 | Vermola et al. | |
| 2005/0117070 A1 | 6/2005 | Wu et al. | |
| 2005/0118946 A1 * | 6/2005 | Colban et al. | 455/3.06 |
| 2005/0130661 A1 | 6/2005 | Aerrabotu et al. | |
| 2005/0153650 A1 | 7/2005 | Hikimoto | |
| 2005/0157735 A1 | 7/2005 | Kan et al. | |
| 2005/0286408 A1 | 12/2005 | Jin et al. | |
| 2006/0025079 A1 | 2/2006 | Sutskover et al. | |
| 2006/0034250 A1 * | 2/2006 | Kim et al. | 370/350 |
| 2006/0039285 A1 | 2/2006 | Chapman et al. | |
| 2006/0079224 A1 | 4/2006 | Welnick et al. | |
| 2006/0088023 A1 | 4/2006 | Muller | |
| 2006/0098676 A1 | 5/2006 | Cai et al. | |
| 2006/0128426 A1 | 6/2006 | Van Rooyen | |
| 2006/0153132 A1 * | 7/2006 | Saito | 370/329 |
| 2006/0153147 A1 | 7/2006 | Chillariga et al. | |
| 2006/0153227 A1 | 7/2006 | Hwang et al. | |
| 2006/0153232 A1 | 7/2006 | Shvodian | |
| 2006/0193286 A1 | 8/2006 | Naghian et al. | |
| 2006/0205406 A1 | 9/2006 | Pekonen et al. | |
| 2006/0227718 A1 | 10/2006 | Wang et al. | |
| 2006/0233359 A1 | 10/2006 | Jung et al. | |
| 2006/0239264 A1 * | 10/2006 | Kang et al. | 370/390 |
| 2006/0244865 A1 * | 11/2006 | Simon | 348/614 |
| 2006/0246890 A1 | 11/2006 | Yasuda et al. | |
| 2006/0262744 A1 | 11/2006 | Xu et al. | |
| 2006/0262751 A1 | 11/2006 | Vermola et al. | |
| 2006/0262793 A1 | 11/2006 | Vare et al. | |
| 2006/0268673 A1 | 11/2006 | Roh et al. | |
| 2006/0285508 A1 | 12/2006 | Vermola et al. | |
| 2007/0026866 A1 | 2/2007 | Krishnamurthi et al. | |
| 2007/0070180 A1 | 3/2007 | Van Rooven | |
| 2007/0091857 A1 | 4/2007 | Elstermann | |
| 2007/0165104 A1 | 7/2007 | Khan et al. | |
| 2007/0165575 A1 | 7/2007 | Niwano | |
| 2007/0167159 A1 | 7/2007 | Ramesh et al. | |
| 2007/0171910 A1 | 7/2007 | Kumar | |
| 2007/0223612 A1 | 9/2007 | Simon | |
| 2007/0240188 A1 | 10/2007 | Vermola et al. | |
| 2007/0249380 A1 | 10/2007 | Stewart et al. | |
| 2007/0274253 A1 | 11/2007 | Zhang et al. | |
| 2008/0008176 A1 * | 1/2008 | Lim et al. | 370/390 |
| 2008/0037460 A1 | 2/2008 | Venkatachalam | |
| 2008/0137652 A1 | 6/2008 | Herrmann et al. | |
| 2008/0152018 A1 | 6/2008 | Ma et al. | |
| 2008/0170529 A1 | 7/2008 | Connors et al. | |
| 2008/0170530 A1 | 7/2008 | Connors et al. | |
| 2008/0198785 A1 | 8/2008 | Huang | |
| 2008/0205322 A1 | 8/2008 | Cai et al. | |
| 2008/0259813 A1 | 10/2008 | Matta et al. | |
| 2008/0316943 A1 | 12/2008 | Mosker et al. | |
| 2009/0028276 A1 | 1/2009 | Van Rooyen | |
| 2009/0129334 A1 | 5/2009 | Ma et al. | |
| 2009/0219909 A1 | 9/2009 | Ko et al. | |
| 2009/0252070 A1 | 10/2009 | Connors et al. | |
| 2010/0020686 A1 | 1/2010 | Lee et al. | |
| 2010/0077173 A1 | 3/2010 | Rao et al. | |
| 2010/0177643 A1 | 7/2010 | Matta et al. | |
| 2010/0241613 A1 | 9/2010 | Rao | |
| 2013/0064253 A1 | 3/2013 | Helms et al. | |

FOREIGN PATENT DOCUMENTS

| | | |
|---|---|---|
| EP | 1 594 330 | 11/2005 |
| EP | 1594330 A | 11/2005 |
| JP | 2003-018108 | 1/2003 |
| JP | 2005-323112 | 11/2005 |
| JP | 2006-074500 | 3/2006 |
| JP | 2006-081171 | 3/2006 |
| JP | 2006081171 A | 3/2006 |
| KR | 10-2004-0000953 | 1/2004 |
| KR | 2004-0000953 | 1/2004 |
| KR | 2005-0017046 | 2/2005 |
| KR | 20050017046 A | 2/2005 |
| WO | 01/50782 | 7/2001 |
| WO | 0150782 | 7/2001 |
| WO | 03/030451 | 4/2003 |
| WO | 03-030451 | 4/2003 |
| WO | 03/081938 | 10/2003 |
| WO | 03/081938 A | 10/2003 |
| WO | 2006/047941 | 5/2006 |
| WO | 2006047941 | 5/2006 |
| WO | 2006/099322 | 9/2006 |
| WO | 2006/105010 | 10/2006 |
| WO | 2006/138556 | 12/2006 |
| WO | 2007/010444 | 1/2007 |

OTHER PUBLICATIONS

"Mobile WiMAX—Part 1: A Technical Overview and Performance Evaluation," WiMAX Forum, pp. 1-53 (Aug. 2006).
International Search Report/Written Opinion issued in PCT/US2008/050719 on Jun. 24, 2008.
International Search Report/Written Opinion issued in PCT/US2008/050302 on Jul. 9, 2008.
Partial International Search Report issued in PCT/US2008/050369 on Jun. 26, 2008.
Qualcomm Corporation, "Flo Technology Brief," www.qualcomm.com/mediaflo (2005).
Qualcomm Corporation, "MediaFlo System," www.qualcomm.com/mediaflo (2005).
Qualcomm Corporation, "MediaFlo Technology Overview," www.qualcomm.com/mediaflo (2007).
Wang et al., "System Architecture and Cross-Layer Optimization of Video Broadcast over WiMAX," IEEE Journal on Selected Areas in Communication, vol. 25, No. 4, pp. 712-721 (May 2007).
"Mobile WiMAX—Part II: A Comparitive Analysis," WiMAX Forum, pp. 1-47 (May 2006).

(56) References Cited

OTHER PUBLICATIONS

Faria et al., "DVB-H: Digital Broadcast Services to Handheld Devices," Proceedings of the IEEE, vol. 94, No. 1, pp. 194-209 (Jan 2006).

IEEE Standard for Local and metropolitan area networks, Part 16: Air Interface for Fixed and Mobile Broadband Wireless Access Systems; Amendment 2: Physical and Medium Access Control Layers for Combined Fixed and Mobile Operation in Licensed Bands and Corrigendum 1, IEEE Computer Society and the IEEE Microwarve Theory and Techniques Society, IEEE Std. 802.16e-2005 and IEEE Std. 802.16-2004/Cor1-2005 (Feb. 28, 2006).

IEEE Standard for Local and metropolitan area networks, Part 16: Interface for Fixed Broadband Wireless Access Systems, IEEE Computer Society and the IEEE Microwave Theory and Techniques Society, IEEE Std. 802.16 (Oct. 1, 2004).

International Search Report and Written Opinion for PCT/US2008/050365 mailed Sep. 4, 2008.

International Search Report and Written Opinion for PCT/US2008/057875 mailed Aug. 20, 2008.

International Search Report and Written Opinion for PCT/US2008/060518 issued Sep. 4, 2008.

International Search Report and Written Opinion for PCT/US2008/060517 mailed Aug. 27, 2008.

International Search Report/Written Opinion issued in PCT/US08/50500 on May 26, 2008.

International Search Report/Written Opinion issued in PCT/US08/50743 on May 13, 2008.

International Search Report/Written Opinion issued in PCT/US2008/057883 on Jul. 29, 2008.

IEEE Standard for Local and metropolitan area networks, Part 16: Air Interface for Fixed and Mobile Broadband Wireless Access Systems; Amendment 2: Physical and Medium Access Control Layers for Combined Fixed and Mobile Operation in Licensed Bands and Corrigendum 1, IEEE Computer Society and the IEEE Microwave Theory and Techniques Society, IEEE Std. 802.16e-2005 and IEEE Std. 802.16-2004/Cor1-2005 (Feb. 28, 2006).

IEEE Standard for Local and metropolitan area networks, Part 16: Interface for Fixed Broadband Wireless Access Systems, IEEE Computer Society and the IEEE Microwave Theory and Techniques Society, IEEE Std. 802.16 (Oct. 2004).

Wang et al., "System Architecture and Cross-Layer Optimization of Video Broadcast over WiMAX", IEEE Journal on Selected Areas in Communications, vol. 25, No. 4, May 2007, pp. 712-721.

Faria et al., "DVB-H: Digital Broadcast Services to Handheld Devices", Proceedings of the IEEE, vol. 94, No. 1, Jan. 2006, pp. 194-209.

"Mobile WiMAX—Part 1: A Technical Overview and Performance Evaluation", WiMAX Forum, Aug. 2006, pp. 1-53.

"Mobile WiMAX—Part II: A Comparative Analysis", WiMAX Forum, May 2006, pp. 1-47.

IEEE Standard for Local and metropolitan area networks, Part 16: Air Interface for Fixed and Mobile Broadband Wireless Access Systems; Amendment 2: Physical and Medium Access Control Layers for Combined Fixed and Mobile Operation in Licensed Bands. and Corrigendum 1, IEEE Computer Society and the IEEE Microwave Theory and Techniques Society, IEEE Std 802.16e-2005 and IEEE Std 802.16-2004/Cor1-2005, Feb. 28, 2006.

IEEE Standard for Local and metropolitan area networks, Part 16: Interface for Fixed Broadband Wireless Access Systems, IEEE Computer Society and the IEEE Microwave Theory and Techniques Society, IEEE Std 802.16, Oct. 1, 2004.

Qualcomm Incorporation, "MediaFlo Technology Overview", 2007,www.qualcomm.com/mediaflo.

Digital Video Broadcasting (DVB); Transmission System for Handheld Terminals (DVB-H), ETSI EN 302 304 V1.1.1 (Nov. 2004) European Standard (Telecommunications series).

Qualcomm Incorporation, "Flo Technology Brief", 2005, www.qualcomm.com/mediaflo.

Qualcomm Incorporation, "MediaFlo System", 2005, www.qualcomm.com/mediaflo.

International Search Report/Written Opinion issued in PCT/US08/50719 on Jun. 24, 2008.

Partial International Search Report issued in PCT/US08/50369 on Jun. 26, 2008.

International Search Report/Written Opinion issued in PCT/US08/50302 on Jul. 9, 2008.

International Search Report/ Written Opinion issued in PCT/US2008/057883 on Jul. 29, 2008.

Faria et al., "DVB-H: Digital Broadcast Services to Handheld Devices," Proceedings of the IEEE, vol. 94, No. 1, pp. 194-209 (Jan. 2006).

IEEE Standard for Local and metropolitan area networks, Part 16: Air Interface for Fixed and Mobile Broadband Wireless Access Systems; Amendment 2: Physical and Medium Access Control Layers for Combined Fixed and Mobile Operation in Licensed Bands and Corrigendum 1, IEEE Computer Society and the IEEE Microwave Theory and Techniques Society, IEEE Std. 802.16-2005 and IEEE Std. 802.16-2004/Cor1-2005 (Feb. 28, 2006).

* cited by examiner

BASE STATION SYNCHRONIZATION FOR A SINGLE FREQUENCY NETWORK

RELATED APPLICATIONS

This application claims the benefit of U.S. Provisional Patent Applications Ser. No. 60/912,661, filed Apr. 18, 2007, entitled "Base Station Synchronization For a Single Frequency Network", Ser. No. 60/953,452, filed Aug. 1, 2007, entitled "Base Stations Synchronization For a Single Frequency Network", and Ser. No. 60/971,837 filed Sep. 12, 2007, entitled "Base Station Synchronization For a single Frequency Network" which are hereby incorporated by reference in their entirety.

BACKGROUND

1. Field

This disclosure relates generally to a wireless communication system and in particular to a wireless broadcast communication system.

2. Background

Wireless communication networks typically have a plurality of servicing base stations which receive and transmit signals to users' devices within the service area of the respective base stations. Communication between a user and their respective base station is maintained as a user moves about the network service area by handing off the user from one base station to another.

Many new services are being offered to customers of wireless communication carriers. One such service is providing customers with multimedia content via the wireless communication network. For example, it is desired to provide audio/video content to customers as they move about the network.

Providing multimedia content via wireless communication networks presents several challenges. For example in broadcast multimedia content to client stations, it is desirable for the transmission of content data to be synchronized at multiple base stations in a network.

Therefore, there is a need for improved systems, apparatus, and techniques for receiving broadcasting content, to ensure that data is smoothly transmitted to end users.

SUMMARY

The present disclosure includes methods, apparatuses, and systems as described in the written description and claims. In one embodiment, a macro-diversity region control module for generating and synchronizing a macro-diversity region transmitted by base stations in a network includes a buffer that may be part of the macro-diversity region control module or may be external to but coupled to the macro-diversity region control module. The macro-diversity region control module can also have a receiving module, a controller module and a communication module. The buffer may be coupled to the receiving module and configured to receive and store content data. The receiving module may be coupled to the controller module and configured to receive a plurality of packets of content data from the buffer. In one embodiment, the controller module may be configured to generate a macro-diversity region data that includes at least one packet of the plurality of packets of content data. The frame offset can be expressed as a number of frames after (or before) the time reference. The combination of the time reference and the frame offset of each macro-diversity frame identify the base station transmission frame that will include the macro-diversity region data for each of the base stations.

The controller module may also generate macro-diversity region control information that includes the time reference and frame offset information. Thus the macro-diversity region control information may be configured to synchronize the transmission of the macro-diversity region data at the base stations. In some embodiments the control information may include a modulation and coding scheme selection information to use in transmitting the macro-diversity region at the base stations. In other embodiments the control information may also include zone switch parameters where the zone switch parameters refer to parameters that determine the location and characteristics of the macro-diversity region in a frame, for example, the base station transmission frame. An example of a zone switch parameter includes a symbol offset to indicate an offset from the start of the base station transmission frame to identify a location for the macro-diversity region data in the base station transmission frame. The macro-diversity region control module may use a configuration file (described below) to determine the zone switch parameters. In some embodiments the control information including the modulation and coding scheme and the zone switch parameters may be configured to ensure that the macro-diversity region is broadcast by each of the base stations using a common waveform.

The communication module may be coupled to the controller module, to communicate a macro-diversity region message that includes the macro-diversity region data and the macro-diversity region control information to the base stations. The controller module may also be configured to determine the size of the macro-diversity region data, the location of the macro-diversity region, an allocation of content data to be broadcast in the macro-diversity region and to determine a broadcast map detailing the structure of the macro-diversity region data. In one embodiment, the time reference may be expressed in coordinated universal time (UTC).

In other embodiments, a base station may include receiving module and a transmitting module. The receiving module may be configured to receive from a central entity, for example macro-diversity region control module, a macro-diversity region message that includes a macro-diversity region data having at least one packet of content data and the macro diversity region control information. The received macro-diversity region control information may include a time reference and frame offset information. The combination of the time reference and the frame offset of each macro-diversity frame may identify the base station transmission frame that will include the macro-diversity region data for each of the base stations. Thus the transmitting module may be configured to transmit the base station transmission frame in synchronization with the transmission of the base station transmission frames of other base stations in a network, for example Single Frequency Network (SFN), in response to at least a portion of the macro-diversity region control information.

In some embodiments, a method of synchronizing a macro-diversity region transmitted by a base station in a network may be implemented in the macro-diversity region control module. In one embodiment the method includes receiving a plurality of packets of content data that may be provided by content providers or content sources. A macro-diversity region data including at least one packet of the plurality of packets of content data may be generated at the macro-diversity region control module. The macro-diversity region control module may also generate macro-diversity region control information including a time reference and frame offset information. The time reference information may be expressed in UTC time. The combination of the time reference and the frame offset of each macro-diversity frame may identify the base station transmission frame that will include the macro-diversity region data for each of the base stations. Thus the macro-diversity region control information may be configured to synchronize the transmission of the macro-diversity region data at the base stations. A macro-diversity region message that includes the macro-diversity region data and the macro-diversity region control information may be communicated to a plurality of base stations. In some embodiments the macro-diversity region control information may include a symbol offset to indicate an offset from the start of the base station transmission frame to identify a location for the macro-diversity region data in the base station transmission frame.

In another embodiment a method of synchronizing a macro-diversity region transmitted by a base station in a network may be implemented at a base station. In one embodiment a plurality of base stations receive the macro-diversity region message that includes a macro-diversity region data having at least one packet of content data and macro diversity region control information. The macro-diversity region control information may include a time reference and frame offset information. The combination of the time reference and the frame offset of each macro-diversity frame may identify the base station transmission frame that will include the macro-diversity region data for each of the base stations. In response to at least a portion of the macro-diversity region control the plurality of base stations synchronously transmit the base station transmission frame in accordance with the macro-diversity region control information.

BRIEF DESCRIPTION OF THE DRAWINGS

These and other aspects, advantages and details of the present disclosure, both as to its structure and operation, may be gleaned in part by a study of the accompanying exemplary drawings, in which like reference numerals refer to like parts. The drawings are not necessarily to scale, emphasis instead being placed upon illustrating the principles of the disclosure.

DETAILED DESCRIPTION

Certain embodiments as disclosed herein provide for methods and systems for synchronization of base transceiver stations (BTS), or base stations, in a network, for example, a network, such as a single frequency network (SFN). After reading this description it will become apparent how to implement the various alternative embodiments and alternative applications. However, although various embodiments will be described herein, it is understood that these embodiments are presented by way of example only, and not limitation. As such, this detailed description of various alternative embodiments should not be construed to limit the scope or breadth of the present disclosure.

Methods, apparatuses and techniques are described for synchronizing transmissions for a plurality of base stations in a single frequency network. In embodiments described herein, techniques are described for synchronization of a macro-diversity region, such as a Multi-cast Broadcast Service (MBS) region, used to transmit data within a frame structure that is common to all base stations belonging to a particular SFN network. In other words, the macro-diversity regions in the transmissions from all of the base stations in a SFN are synchronized. As described further below, examples are provided of the types of information that may be expected to be sent to the base stations by other network entities as well as the actions that the base stations may take upon reception of the information.

Figure 1:
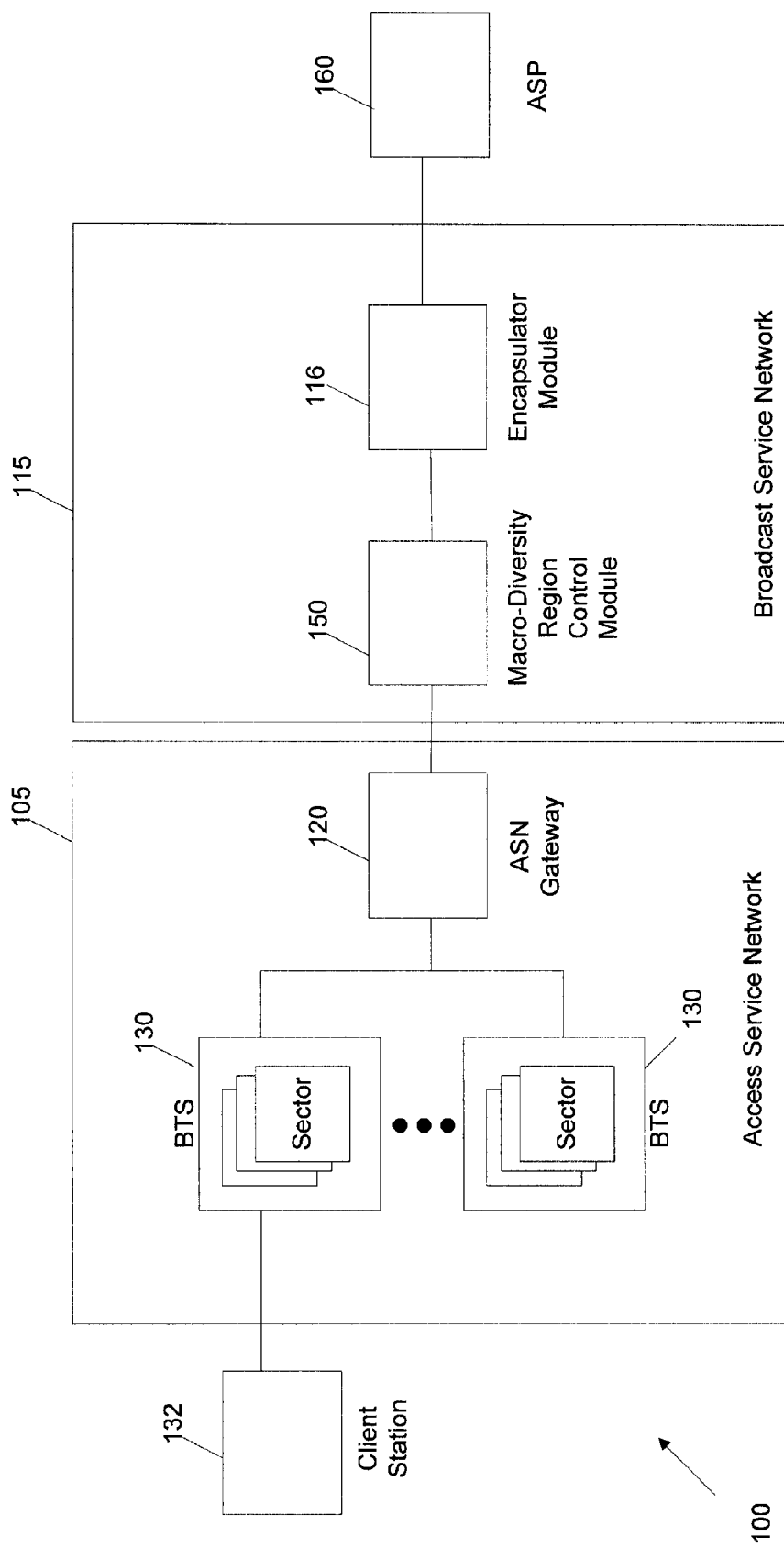
FIG. 1 is a block diagram of an example network in which a data frame comprising a macro-diversity region may be used for broadcasting data to a plurality of client stations in accordance with an embodiment.

FIG. 1 is a block diagram of an example network 100 for broadcasting data to a plurality of client stations 132 in accordance with an embodiment. For exemplary purposes, network 100 will be described with reference to a network 100 in which data is broadcast to client stations 132 using a macro-diversity region of a data frame, such as, for example, an macro-diversity region of a Worldwide Interoperability for Microwave Access Orthogonal Frequency-Division Multiple Access (WiMAX OFDMA) frame. Other exemplary embodiments utilize other frame based systems including, for example Long Term Evolution (LTE) system or other now or later developed communications systems. LTE is the name given to a project within the Third Generation Partnership Project to improve the Universal Mobile Telecommunications System (UMTS) mobile phone standard to cope with future requirements.

In the example illustrated in FIG. 1, the network 100 includes at least one client station 132, an Access Service Network (ASN) 105, a Broadcast Services Network (BSN) 115, and an Application Service Provider (ASP) 160. In the present example, ASP 160 provides one or more streams of internet protocol (IP) packets comprising content data for broadcast to the client stations 132. Broadcast services network 115, as illustrated, receives the stream(s) of IP packets and processes and packages the received content data for broadcast to client stations 132. ASN 105 may provide access services between the broadcast services network 115 and client stations 132 in transmitting the content data to the client stations 132.

As noted above, ASP 160 provides one or more IP streams comprising content data for broadcast to the client stations 132. These IP streams may be provided to the broadcast services network 115 directly or, for example, via a network (not shown), such as a local area network (LAN) (e.g., an Ethernet network), a metro area network (MAN), or a wide area network (WAN) (e.g., the Internet), or a combination thereof.

This content data may comprise, for example, audio (e.g., music, speech, etc.), visual (e.g., pictures, images, movies, television, etc.), textual (e.g., word processing documents, spreadsheets, etc.), or other types of data regarding content of interest to a user. For explanatory purposes, the provided content data will be described as being audio/visual data. Further, in an embodiment, each provided IP stream may comprise content data for a particular audio/visual channel, such as, for example, one or more IP streams may comprise content data for providing a television news program (e.g., CNN, Fox News, etc.), one or more IP streams may be provided for broadcasting movies, one or more IP streams may be provided for transmitting sports programs, etc.

In an embodiment, a broadcast service provided by a particular ASP 160 is identified by a single broadcast channel identifier (CID). As used herein, a broadcast service refers to a collection of content data that may be encoded using a common encoding scheme, such as, for example, (Moving Picture Experts Group) MPEG at a particular resolution (e.g., low resolution for small screens such as mobile phones, high resolution for high definition television (HDTV), etc.). This broadcast CID may then be used by the client stations 132 to determine if the broadcasted content data comprises content data that the client station desires to receive (e.g., the broadcasted content data is for a broadcast service to which the client station subscribes). For example, in an embodiment, there may be multiple ASPs 160 each providing a different broadcast service, where a client station 132 may only be enabled to receive and provide content data belonging to a particular broadcast service (e.g., the client station may only subscribe to the broadcast service proved by one particular ASP).

As illustrated, broadcast service network 115 may include an encapsulator module 116 and a macro-diversity region control module 150. In one embodiment the macro-diversity region control module 150 may be part of, for example, the ASN Gateway 120, or a Network Manager, or other entity. The choice of the entity on which this functionality resides may vary depending on, for example the infrastructure vendor. In addition, the functionality may be distributed across multiple entities. Essentially, the Broadcast Service Network (BSN) and Access Service Network (ASN) blocks are for explanatory purposes, and in some embodiments, the MBS controller or macro-diversity region control module 150 and encapsulator may exist elsewhere and the BSN may be optional. In some embodiments, the macro-diversity region control module 150 and encapsulator may be in the ASN, or in the ASP. Broadcast service network 115 may be operated by a single network service provider (NSP). Further, although for simplification only a single broadcast service network is illustrated, it should be understood that in application there may be multiple broadcast service networks 115 each operated by a different NSP. These other broadcast services networks may be connected to different ASNs 105 and ASPs 160, or for example, multiple broadcast service networks may be connected to a particular ASN and/or ASP.

Encapsulator module 116 may receive the IP streams from ASP 160 and time slice the received IP packets. Encapsulator module 116 may then package the time sliced IP packets into transport packets for wireless transmission of the content data. As used herein, a transport packet refers to any type of data packet useable for transporting data, and may use any type of format or protocol in transporting the data. For example, in an embodiment in which the content data comprises audio/visual content, the encapsulator module 116 may time slice the received IP packets and package the time sliced IP packets in transport packets, such as, for example, Motion Picture Expert Group 2 (MPEG-2) transport packets. Further, in an embodiment, the encapsulator module 116 may perform time slicing operation in accordance with the European Telecommunications Standards Institute (ETSI) standard for Digital Video Broadcast—Handheld (DVB-H) along with performing multi-protocol encapsulation with forward error correction (MPE-FEC). Additionally, in an embodiment, the encapsulator module 116 may wrap the packets (e.g., transport packets) with an IP header prior to outputting the wrapped packets.

The encapsulator module 116 may then provide the transport packets to the macro-diversity region control module 150. The macro-diversity region control module 150 may then package the transport frames for broadcast to the client station 132. Additionally, in an embodiment, the macro-diversity control module 150 may further insert time stamping information in the received transport packets. The time stamping information added to the transport packets (e.g., MPEG-2 transport packets) may be used by the base stations to enable the individual base stations 130 to time synchronize the transmission of the content data to the client stations 132, so that each base station 130 simultaneously transmits the content data. In some embodiments macro-diversity region control module 150 may include a modulation and coding scheme selection information and zone switch parameters in the received transport packets for use by the base stations 130 in transmitting the macro-diversity region. The zone switch parameters refer to parameters for determining the location and characteristics of the macro-diversity region in a frame, for example, the base station transmission frame. An example of a zone switch parameter includes a symbol offset to indicate an offset from the start of the base station transmission frame to identify a location for the macro-diversity region data in the base station transmission frame. The macro-diversity region control module may use a configuration file (described below) to determine the zone switch parameters. In some embodiments the modulation and coding scheme selection information and the zone switch parameters may be configured to ensure that the macro-diversity region is broadcast by the base stations using a common waveform. Further, in an embodiment, the macro-diversity region control module 150 may further combine multiple received transport packets into a larger frame (referred to herein as a "mega-frame") for transmission by the base stations 130.

In an embodiment, the macro-diversity region control module 150 defines a macro-diversity region for inclusion in a data frame for transmitting the content data to the client stations 132. For example, the macro-diversity region defined may be a Multicast Broadcast Services (MBS) region of an OFDMA data frame, such as, for example, an OFDMA data frame in accordance with Institute of Electrical and Electronics Engineers (IEEE) 802.16e. A further description of the macro-diversity region is provided below.

As illustrated, ASN 105 includes a plurality of base stations 130 and an ASN Gateway 120. In one embodiment, base stations 130 may include an antenna system that is sectorized into one or more sectors with each sector transmitting and receiving signals within a corresponding coverage area, wherein the coverage area of the sector may be the same or less than the total coverage area of the base station. ASN Gateway 120 may provide access gateway functions between the base stations 130 and the broadcast service network 115, and may be, for example, a commercially available ASN Gateway, such as, for example, a Cisco ASN Gateway. It should be further noted that although an ASN Gateway is used in the exemplary embodiment of FIG. 1, in other embodiments an ASN Gateway need not be used.

The defined macro-diversity region may then be communicated to the base stations 130. The base stations 130 may comprise hardware (e.g., a processor, memory, one or more buses, etc.) and software for building data frames including the defined macro-diversity region using the information received from the macro-diversity region control module 150. These data frames may be, for example, OFDMA data frames in accordance with IEEE 802.16e. The base stations 130 may then broadcast the OFDMA data frames including the macro-diversity region. Further, the base stations 130 may be synchronized so that the macro-diversity regions transmitted by the base stations 130 are identical and synchronized. It should be noted that although in this embodiment each base station 130 simultaneously broadcasts a common macro-diversity region, the remainder of the data frames transmitted by each base station 130 need not include common data. A further description of an exemplary data frame comprising a macro-diversity region is presented below.

Client stations 132 may be mobile, nomadic or stationary units. The client stations 132 are often referred to as, for example, mobile stations, mobile units, subscriber stations, wireless terminals or the like. Client station 132 may be, for example, a wireless handheld device, a vehicle mounted device, a portable device, client premise equipment, fixed location device, wireless plug-in accessory or the like. In some cases, client stations 132 may take the form of a handheld computer, a notebook computer, a wireless telephone, personal digital assistant, wireless email device, personal media player or the like. Further, client stations 132 may include a receiver that receives signals broadcasted by ASN 105. Client station 132 may also include one or more displays (e.g., a liquid crystal display (LCD), etc.) and speaker(s) for use in presenting content (e.g., audio and/or visual) to a user of the client device. Optionally, the client station 132 may also include a storage device (e.g., volatile or non-volatile memory) for recording the received signal.

It should be noted that although FIG. 1 illustrates exemplary modules for processing the incoming content data for transmitting the content data to the client stations 132 using a macro-diversity region, in other embodiments alternate modules may be used or, for example, the functions performed by the modules may be combined or split into different modules. For example, although FIG. 1 illustrates a macro-diversity control module 150 for time stamping the incoming data and defining a macro-diversity region, in other embodiments, these functions may be split into separate modules. For example, in an embodiment, a single frequency network (SFN) module may be used to time stamp the incoming content data and package the transport packets into mega-frames that it then communicates to the macro-diversity control module over a network, such as an Ethernet network. The macro-diversity control module in such an example, may then define the macro-diversity region using the time stamped information received from the SFN module.

Figure 2:
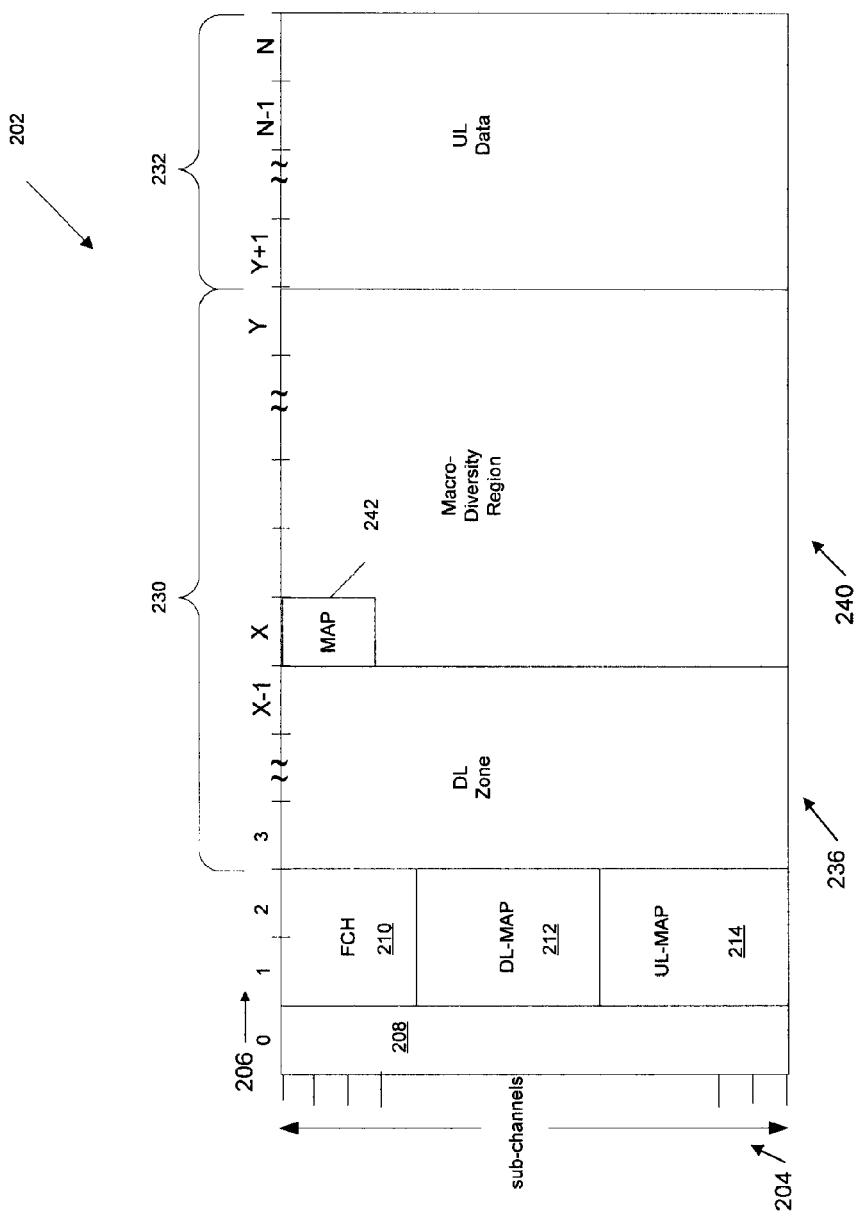
FIG. 2 is a diagram illustrating an example data frame structure that may be used to transmit data between a base station and a client station in accordance with an embodiment.

FIG. 2 is a diagram illustrating an example data frame structure that may be used to transmit data between a base station 130 and a client station 132. As noted above, in an embodiment, this data frame may be built by the base stations 130. As illustrated, the data frame 202 structure may be divided into multiple sub-channels 204 (along the vertical axis in FIG. 2), with each sub-channel using a carrier frequency that is orthogonal to the carrier frequencies of other sub-channels. The frame 202 is also divided in time into symbol periods 206 (along the horizontal axis in FIG. 2). As illustrated in FIG. 2, in data frame 202, data may be carried on each of the sub-channel carrier frequencies 204 simultaneously during individual symbol periods 206. Further, a group of consecutive symbols may be treated as a symbol groups, such that the frame 202 is split into a fixed number of symbol groups each consisting of a particular number (e.g., 2, 4, etc.) of consecutive symbols.

In the example of FIG. 2, the data frame 202 includes a preamble 208 during symbol period 0. During symbol periods 1 and 2, the data frame 202 includes a frame control header (FCH) 210 and a downlink media access protocol (DL-MAP) message 212 and uplink media access protocol (UL-MAP) message 214. Generally, the FCH 210 may include information about the frame 202 configuration and about the DL-MAP 212, such as modulation and coding scheme for the DL-MAP 212, DL-MAP 212 message lengths, usable sub-channels of the frame 202, and the like. The DL-MAP 212 can also carry overhead messages that include information broadcast from a base station 130 to at least one client station 132. Alternatively, overhead messages can be included in other portions of the data frame 202.

The downlink and uplink maps 212 and 214 include information about the location of downlink and uplink content within the data frame 202 or a subsequent frame. The data frame 202 includes a downlink region 230 and an uplink region 232 defined by the downlink and uplink maps. Included in the downlink region 230 is a downlink data region 236 and a macro-diversity region 240. While FIG. 2 illustrates an example of the macro-diversity region 240 being located at the end of the downlink region 230, in other embodiments the macro-diversity region 240 can be located at other positions in the downlink region 230. In addition, the macro-diversity region 240 does not need to be continuous, but can be separated into multiple regions within the downlink region 230.

The downlink region 230 may be used for transmitting information from the base stations to the client stations, while the uplink region 232 may be used for transmitting information in the opposite direction, i.e., from the client stations to the base stations. Further, as illustrated, management messages 238 may be transmitted from the base stations to the client stations in the downlink data region 236 of the downlink region 240. These management messages may be, for example, Media Access Control (MAC) management messages. Further, in an embodiment, MAC management messages broadcasted to the client stations may be included in the initial (i.e., far left) portion of the downlink data region 236 with traffic bearing data (e.g., Voice over IP traffic (VOIP), World Wide Web (WWW) data, etc.) and other types of data (e.g., uni-cast MAC management messages) following the broadcasted MAC management messages in the downlink data region 336. Similarly, MAC management messages transmitted from the client stations to the base stations may use the uplink region 232 of the data frame 202. As will be discussed in further detail below, in an embodiment, a MAC management message identifying the content data broadcasted in the macro-diversity region may be broadcast to the client stations using the downlink data region 236 and broadcasted in the same or similar manner that other MAC management messages are broadcast to the client stations.

As illustrated, the macro-diversity region 240 may include a macro-diversity region map 242 that defines the size and content of the macro-diversity region 240. In one embodiment, the macro-diversity map 242 rather than defining the macro-diversity region 240 for the data frame 202 the map 242 resides in, the macro-diversity region map 242 defines the size and content of a macro-diversity region 240 in a subsequent data frame 202. For example, the macro-diversity map 242 may define the size and content of a macro-diversity region in the next data frame in time (i.e., the frame sent immediately after the data frame in which the map 242 resides), or the second data frame 202 following the current frame, or other subsequent data frames of data. The map 242 may further include an information element (IE) including a broadcast CID that identifies the broadcast service(s) included in the macro-diversity region 240, or multiple broadcast CIDs in embodiments in which the macro-diversity region 240 includes content data belonging to different broadcast services.

In an embodiment, the base stations 130 may transmit the different regions of frame 202 using different modulation schemes. For example, in an embodiment, the base stations may use a simple modulation for transmitting the preamble 208 (e.g., BPSK), a different modulation scheme for transmitting the downlink data region (e.g., QPSK), yet another modulation scheme for transmitting the macro-diversity region 240 (e.g., QAM), and yet another modulation scheme for transmitting the uplink region 232 (e.g., QPSK).

Figure 3:
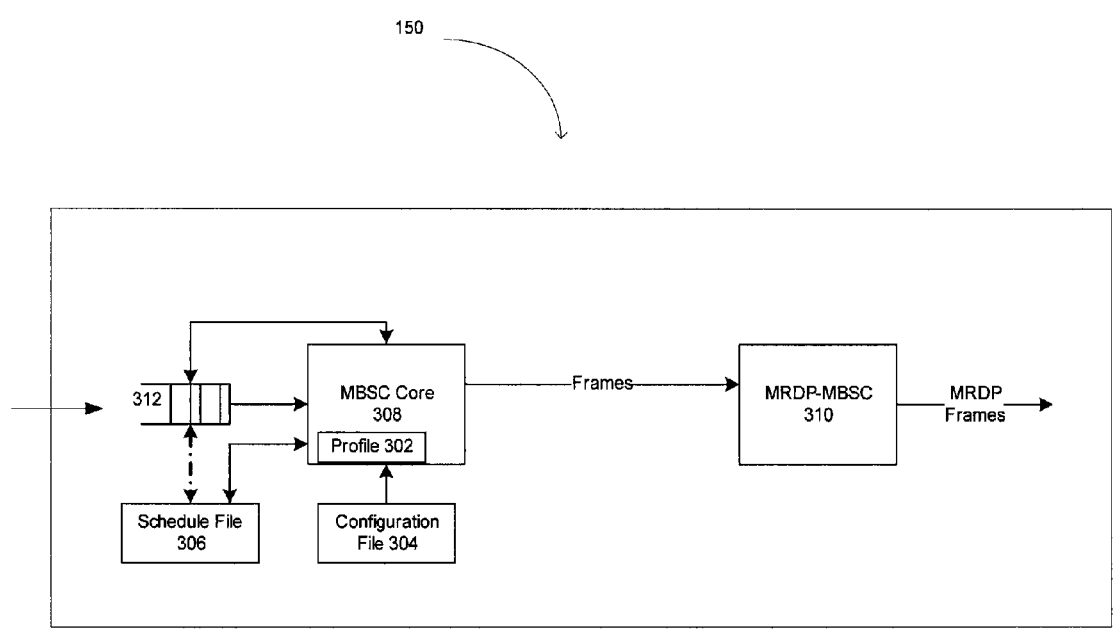
FIG. 3 illustrates an example of the operation or function of a macro-diversity region control module in accordance with an embodiment.

FIG. 3 illustrates an example of the operation or function of a macro-diversity region control module 150 illustrated in FIG. 1 in accordance with an embodiment. For explanatory purposes, FIG. 3 will be discussed with reference to the above-discussed FIG. 1. Note that in FIG. 1 the broadcast data flows from right to left while in FIG. 3 the broadcast data flows from left to right.

As noted above in describing FIG. 1, in an embodiment, the macro-diversity region control module 150 may be, for example, a Multicast Broadcast Service Controller (MBSC). As illustrated, the macro-diversity region control module 150 may have a buffer 312 that may be part of the macro-diversity region control module 150 or may be external but coupled to the macro-diversity region control module 150. The macro-diversity region control module may also have a macro-diversity region control module core 308 or MBSC core coupled to the buffer 312. The macro-diversity region control module 150 behavior can be controlled by three data sets. Each one of these data sets may be stored in an Extensible Markup Language (XML) file, stored by for example a storage (E.g. volatile or nonvolatile RAM, ROM etc.) in the macro-diversity region control module 150. These three files are collectively referenced as setup files and include a Profile File 302, a Configuration File 304 and a Schedule File 306. The Profile File 302, Configuration File 304 and a Schedule File 306 may be generated manually by an administrator, for example an engineer, or by a program outside the macro-diversity region control module 150, and uploaded to the macro-diversity region control module 150. The macro-diversity region control module 150 can also include a macro-diversity region control module core 308 and an MBS Region Distribution Protocol (MRDP)-MBSC interface 310. The Profile File 302 includes a profile that sets the most basic and long term parameters of the macro-diversity region control module 150. A profile change may be, for example, a major change and in some embodiments requires a system reset. For example, in a system employing WiMax in accordance with 802.16, exemplary parameters stored by the profile may include the following:

The output burst type (E.g. hybrid automated repeat request (HARQ) or convolution codes (CC)/convolution turbo codes (CTC)) to be used in transmitting the macro-diversity region;

The number of subchannels allocated to the macro-diversity region;

The permutation type to be used by the base stations in transmitting on the downlink, where the permutation type is a scheme for mapping sub-channels to physical sub-carriers in an OFDMA symbol. (E.g. full usage of sub-carriers (FUSC—this scheme makes up sub-channels by using total sub-carriers assigned for data in total frequency bands), partial usage of sub-carriers (PUSC—this scheme makes up sub-channels by using a portion of sub-carriers assigned for data in total frequency bands), adaptive modulation and coding (AMC—this scheme makes up sub-channels by dividing adjacent bands in total frequency bands));

The modulation type, for example quadrature phase-shift keying (QPSK), quadrature amplitude modulation (QAM) or 64QAM, to be used in transmitting the macro-diversity region;

A backlog target delay (E.g. specified in terms of milliseconds), for example: this parameter states the target average amount of time each data byte stays in the buffer 312 before being allocated to the macro-diversity region;

One or more macro-diversity frame descriptors for defining the structure of the macro-diversity region (Note that in an alternative embodiment, one or more frame region descriptors may be included in a frame lookup table included in the macro-diversity profile);

The number of frame descriptors specified in the lookup table:

The maximum macro-diversity width can be described in this profile;

MBS information element (IE) which specifies constant bit fields of the macro-diversity region;

Cyclic redundancy check-32 (CRC-32): if this option is set, the last four bytes of each PDU will be CRC-32. (CRC is a common technique for detecting data transmission errors).

In one embodiment an active profile can be specified via a Management Information Base (MIB) entry maintained by the macro-diversity region control module 150, where the term active profile refers to the system profile that is currently in use.

The Configuration File 304 may include a number of configuration settings with each configuration setting having one or more parameters governing the behavior of the macro-diversity region control module 150 at a given data rate or at a range of subset of data rates. Generally, the Configuration File may change when, for example, the expected incoming data rates or number of channels over the air changes, with the new Configuration File having different values for the parameters. In an exemplary system employing WiMax in accordance with 802.16 exemplary configuration parameters may include:

Incoming data rate in bits per second;

Space maximum macro-diversity region width at the specified incoming data rate in terms of the number of symbol groups;

The number of symbols in the DL sub-frame to be used by the base stations in transmitting to the client stations;

An MBS_IE overwrite pattern that can be encoded in Base-64; for example, an MBS_IE overwrite pattern may be included that specifies the location of bits in an MBS_IE stored by the Profile File 302 that can be overwritten;

An MBS_MAP overwrite pattern encoded in base-64 that specifies the location of bits in an MBS_MAP stored by Profile File 302 that may be overwritten;

One or more backlog tolerance margins that specify the percentage of high and low levels of content data in the buffer 312, for example, for a target backlog buffer level of 100 bytes the backlog tolerance margins may be between 100.40 and 99.70 bytes;

The feedback loop delay specifies the minimum number of OFDMA frames between two consecutive measurements of the backlog level after any width change of the macro-diversity region frame;

A downstream target delay that specifies the amount of time between generation of a frame and its over the air broadcast; this target delay may be used in time stamping of generated frames that will be discussed further in detail below; Further this target delay, in some embodiments, may be selected large enough to take into account for distribution of the frame to all base stations in the network;

An interface protocol type for use in communications between the macro-diversity region control module 150 and the ASN-GW 120;

A minimum starting symbol such that the macro-diversity region may not occupy a symbol period smaller than this parameter;

A maximum finishing symbol such that the macro-diversity region may not occupy a symbol period after this parameter and frame descriptor.

In some embodiments, the configuration setting may adjust the set of system parameters that are dependent on the incoming rate and are susceptible to change as a result of the change in the incoming rate. The set of system parameters may be a group of dependent parameters that usually need to change together. Some of these system parameters are loosely dependent on the information in the profile 302, but they may also identify shorter term rate dependent behavior of the system. In one embodiment, the Configuration File 304 may be generated manually by an administrator, for example an engineer, or by a program outside the macro-diversity region control module 150. The Configuration File may be generated with knowledge of the active profile in use and may be consistent with the active profile, where the term active profile refers to the system profile that is currently in use. The configuration file may be uploaded and stored in the macro-diversity region control module 150.

The Schedule File 306 includes a plurality of schedule entries defining a schedule of rate changes. The set of parameters associated with the Schedule File 306 may specify what input rates may be expected at any given time. In one embodiment Schedule File 306 may be loaded to the MBSC management information base (MIB) such that it can be updated via a Simplified Network Management Protocol (SNMP) connection. The MIB refers to a database of system parameters which can be queried and changed (with some access provisions) remotely via the SNMP protocol. Each schedule entry includes a specified instance of time and a specified input rate to indicate the specified instance of time the next rate change schedule becomes effective. The macro-diversity region control module 150 chooses the configuration setting that provides the best match for the data rate specified by the Schedule File 306 for the current instance of time. Profile Files 302 and Configuration Files 304 are usually static elements of the system. For example, although it is expected that the Configuration File 304 will be normally static, it may be changed in certain circumstances such as noted above.

The macro-diversity region control module may provide the capability of changing the active Configuration File. A MIB element may specify the new Configuration File along with the time of the change of the Configuration File. The new Configuration File may become effective at the scheduled rate change that coincides with the time specified in the MIB entry. The fundamental behavior of the macro-diversity region control module may be regulated by a set of parameters specified by the active profile. The macro-diversity region control module core 308 may extract the frame structure, for example frame length, from the Profile File 302, populate the frame and send the populated frame to an interface 310 that may use a proprietary interface, where the populated frame may subsequently be transmitted to the ASN-GW 120, for example. For exemplary purposes, an interface that may be used will be referred to herein as MRDP-MBSC. The MRDP-MBSC 310 may be an application layer protocol that runs at the macro-diversity region control module 150, and serves as the interface to external devices, for example, the ASN-GW 120 illustrated in FIG. 1.

In one embodiment, the macro-diversity region control module 150 may adopt a configuration setting from the Configuration File 304 based on the Schedule File 306. The configuration setting specifies the incoming data rate from the IP encapsulator 116 illustrated in FIG. 1. The incoming data stream may be deposited into the buffer 312, where the macro-diversity region control module core 308 can monitor the backlog level of the buffer 312 and keep the backlog level within a target range. The macro-diversity region control module core 308 can keep the backlog within a target range by controlling the outgoing data rate by changing the width of the macro-diversity region. This process of balancing the incoming data rate with the outgoing data rate can be decided by a buffer balancing algorithm and is referred to herein as rate matching. The structure of the macro-diversity region as well as the structure of these OFDMA frames may be described in the profile according to the Configuration File 304 and the Profile File 302. The frame description may define the structure of the macro-diversity region including the structure of the frame and how it actually will be filled with data bytes. The macro-diversity region control module fills up each frame with data bytes from the buffer 312 in accordance with the specified frame structure.

Figure 4:
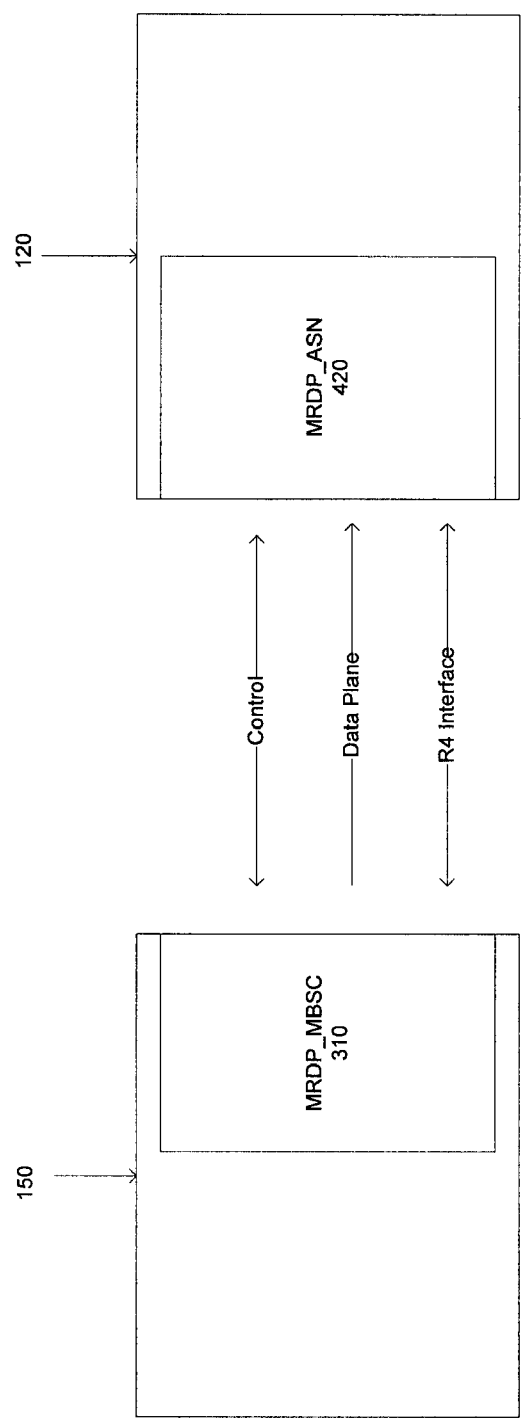
FIG. 4 is an illustration of an application layer protocol that runs at the macro-diversity region control module and the Access Service Network—Gateway (ASN-GW) in accordance with an embodiment.

FIG. 4 is a simplified diagram illustrating an application layer protocol that runs at the macro-diversity region control module 150 and the ASN-GW 120 according to an embodiment. For explanatory purposes, FIG. 4 will be discussed with reference to the above-discussed FIGS. 1 and 3. An application layer protocol, for example a proprietary application layer protocol, runs at the macro-diversity region control module 150 and the ASN-GW 120 using an interface, for example an R4 interface. The R4 interface may include a set of protocols originating/terminating in various entities within the ASN-GW 120 and/or macro-diversity region control module 150, for example, for coordinating data mobility between the ASN-GW 120 and the macro-diversity region control module 150. For explanatory purposes an embodiment of this interface will be hereinafter referred to as MRDP. The MRDP_MBSC functional instance 310 is situated at the macro-diversity region control module 150 and the MRDP_ASN functional instance 420 is situated at the ASN-GW. The MRDP protocol provides a communication link between the macro-diversity region control module 150 and the ASN-GW 120 that the macro-diversity region control module 150 may use to send information regarding the macro-diversity region to the ASN-GW 120 over the R4 interface. In some embodiments two types of information flow between the macro-diversity region control module 150 and the ASN-GW 120. The first is control messages that go in both directions between the MRDP_MBSC 310 and the MRDP_ASN 420. The second is data plane messages (i.e., messages comprising the packets of content data for broadcast to the client stations 132) going from the MRDP_MBSC 310 to the MRDP_ASN 420.

Figure 5:
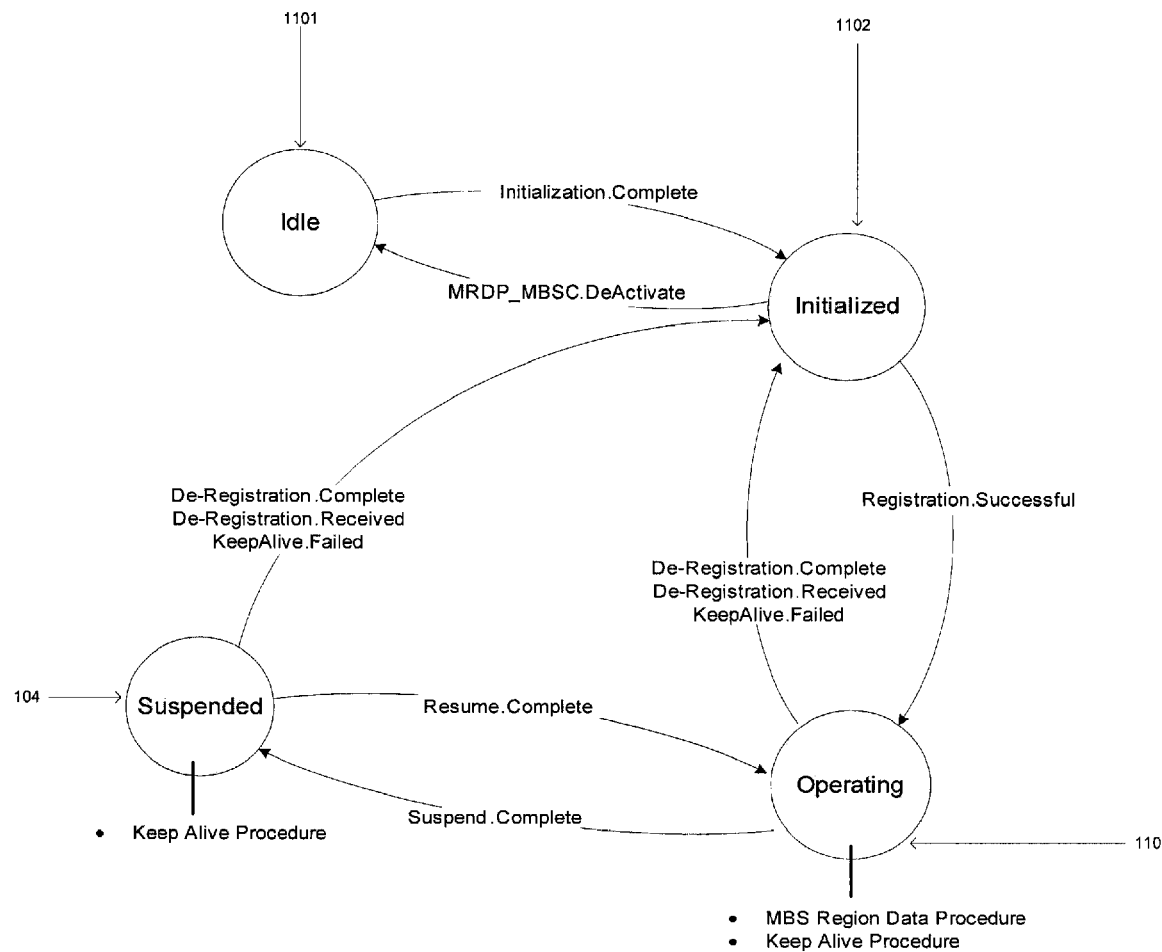
FIG. 5 illustrates an example of an MRDP_MBSC state transition diagram in accordance with an embodiment.
Figure 6:
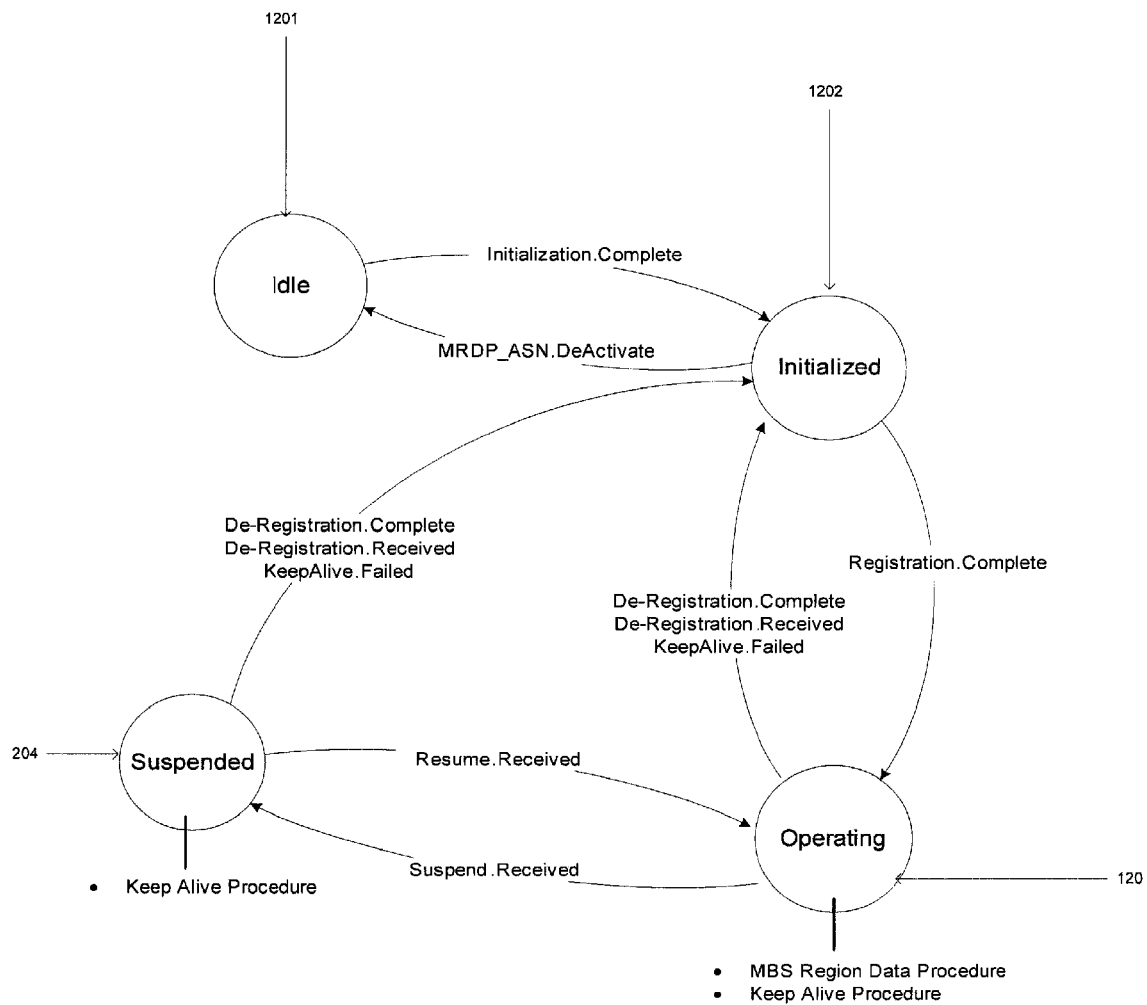
FIG. 6 illustrates an example of MRDP_ASN state transition diagram in accordance with an embodiment.

FIG. 5 and FIG. 6 illustrates an example of a state transition diagram of the MRDP_MBSC and MRDP_ASN respectively. Each of the MRDP procedures described below may be initiated by, for example, either the above-discussed MRDP_MBSC 310 or MRDP_ASN 420 to accomplish an action or indicate a condition. The MRDP procedures described are state dependent and therefore may be initiated in certain MRDP states. For any given MRDP procedure described below, the instructions received or sent by a state machine for example MRDP_MBSC or MRDP_ASN may be in the form of commands and indications. The MRDP_MBSC or MRDP_ASN may have four states including Idle State 1101 or 1201 respectively, Initialized State 1102 or 1202 respectively, Operating State 1103 or 1203 respectively and Suspended State 1104 and 1204 respectively.

In one embodiment when the macro-diversity region control module 150 or the ASN_GW 120 have just powered on or have been through a reset cycle, MRDP_MBSC or MRDP_ASN will start off at the Idle State 1101 or 1202. The MRDP_MBSC or MRDP_ASN does nothing in Idle State but wait for a command to be activated. The activation commands may be, for example, MRDP_MBSC.Activate command or MRDP_ASN.Activate command, from the macro-diversity region control module 150 or ASN-GW 120 that starts an initialization procedure. In one embodiment the MRDP_MBSC or MRDP_ASN ignores any other commands or messages in the Idle State 1101 or 1201 other than the initialization commands (E.g. MRDP_MBSC.Initialized or MRDP_ASN.Initialized). The initialization procedure is used by one MRDP endpoint, for example MRDP_MBSC or MRDP_ASN, to initialize and prepare to perform other procedures. In some embodiments both the MRDP_MBSC and the MRDP_ASN may start their own initialization procedure independently and asynchronously. The activation commands from the macro-diversity region control module 150 or ASN-GW 120 may trigger the MRDP_MBSC or MRDP_ASN state machine to issue an initialization procedure command. (E.g. InitializationProc.Activate command). When the initialization process is complete, the MRDP_MBSC or MRDP_ASN receives an initialization process complete command (E.g. InitializationProc.Complete) and the MRDP_MBSC or MRDP_ASN issues an indication that the MRDP_MBSC or MRDP_ASN is initialized (E.g. MRDP_MBSC.Initialized or MRDP_ASN.Initialized) to the MBSC core 308 or ASN-GW core (not shown) function. The MRDP_MBSC then transitions from the Idle State 1101 to the Initialized State 1102 illustrated in FIG. 5 (initialization complete). Likewise the MRDP_ASN transitions from the Idle State 1201 to the Initialized State 1202 illustrated in FIG. 6.

In the Initialized State 1102, the MRDP_MBSC is waiting for a register command (E.g. MRDP_MBSC.Register command) from MBSC core function to initiate a Data Path Registration Procedure that will allow the MRDP_MBSC to transition to the Operating State 1103 to start the macro-diversity region data transmission. Likewise in the Initialized State 1202, the MRDP_ASN is waiting for the registration request message from the macro-diversity region control module 1500 in order to start the Data Path Registration Process.

If the MRDP_MBSC receives the register command from the macro-diversity region control module core 308, the MRDP_MBSC may issue a command to activate the registration procedure (E.g. RegistrationProc.Activate command) in order to start the Data Path Registration Procedure. If the MRDP_MBSC receives an indication that the registration procedure failed (E.g. RegistrationProc.Failed indication) the MRDP_MBSC may issue an indication that the MRDP_MBSC registration failed. (E.g. MRDP_MBSC.RegFailed indication) to MBSC core function. However, if the MRDP_MBSC receives an indication that the registration procedure succeeded (E.g. RegistrationProc.Successful indication) the MRDP_MBSC may issue an indication that the MRDP_MBSC is operating to MBSC core function. (E.g. MRDP_MBSC. Operating indication). The MRDP_MBSC then transitions from the Initialized State 1102 to the Operating State 1103. On the other hand, if the MRDP_MBSC receives a deactivation command (E.g. MRDP_MBSC.DeActivate command) from the MBSC 150, the MRDP_MBSC may issue a registration procedure deactivation command (E.g. RegistrationProc.DeActivate command) and issue an indication that the MRDP_MBSC has transitioned back to its Idle State 1101. In one embodiment the MRDP_MBSC may ignore any other commands or messages in Initialized State 1102 other than the register command.

Similarly, if the MRDP_ASN receives a RegistrationProc.Complete indication that the registration procedure has been completed, the MRDP_ASN may issue an indication that the MRDP_ASN is in operation. (E.g. MRDP_ASN.Operating) to the ASN-GW core function. The MRDP_ASN then transitions from the Initialized State 1202 to the Operating State 1203. However if the MRDP_ASN receives a command to deactivate (E.g. MRDP_ASN.DeActivate command) from the ASN-GW core function, the MRDP_ASN may issue a RegistrationProc.DeActivate command and issue an indication that the MRDP_ASN has transitioned back to its Idle state 1201 to the ASN-GW core function. In one embodiment the MRDP_ASN can ignore any other commands or messages in Initialized State 1202 other than the above-described.

After registration, the MRDP_MBSC enters the Operating State 1103 and starts to send out macro-diversity region data. In the Operating State the MRDP_MBSC may issue various commands including a command to activate the procedure that monitors the network connection between the macro-diversity region control module 150 and the ASN-GW (E.g. KeepAliveProc.Activate command) (hereinafter the keep alive procedure) and a command to activate the macro-diversity region Data transmission (E.g. MBSDataProc.Activate command). The procedure to monitor the network connection between the macro-diversity region control module 150 and the ASN-GW may be active throughout the duration of the Operating State 1103 and the Suspended State 1104. If MRDP_MBSC receives a command from the macro-diversity region control module core 308 function to suspend the Operating State 1103 (E.g. MRDP_MBSC. Suspend command) the MRDP_MBSC may issue a command to activate the suspend procedure. (E.g. SuspendProc.Activate command). If MRDP_MBSC receives an indication from the macro-diversity region control module core 308 that the suspend procedure has been completed (E.g. SuspendProc.Complete indication), the MRDP_MBSC may issue a command to deactivate the macro-diversity region data transmission (E.g. MBSDataProc.DeActivate command) and an indication to suspend the MRDP_MBSC (E.g. MRDP_MBSC.Suspended indication). The MRDP_MBSC then transitions from the Operating State 1103 to the Suspended State 1104 where the macro-diversity region data transmission is suspended. If MRDP_MBSC receives a de-registration command from macro-diversity region control module core 308 function (E.g. MRDP_MBSC.DeRegister command), the MRDP_MBSC may issue a command to activate the de-registration procedure. (E.g. De-RegistrationProc.Activate command). If MRDP_MBSC receives an indication from the macro-diversity region control module core 308 that includes an indication that the de-registration request message has been completed (E.g. De-RegistrationProc. Complete indication), or an indication that a de-registration procedure has been received (E.g. De-RegistrationProc.Received indication) or an indication that the network connection between the macro-diversity region control module 150 and the ASN-GW failed to be kept alive (E.g. KeepAliveProc.Failed indication) the MRDP_MBSC may issue a various commands and indications including a command to deactivate the macro-diversity region data transmission (E.g. MBSDataProc.DeActivate command), a command to deactivate the keep alive procedure (E.g. KeepAliveProc.DeActivate command), a command to de-activate the de-registration procedure or (E.g. De-RegistrationProc.DeActivate command), a command to de-activate the suspend procedure. (E.g. SuspendProc.DeActivate command) and an indication that the MRDP_MBSC is initialized (E.g. MRDP_MBSC.Initialized). The MRDP_MBSC then transitions from the Operating State 1103 to the Initialized State 1102. In one embodiment the MRDP_MBSC can ignore any other commands or messages in Operating State 1103 other than the above-described suspend the Operating State 1103 command or de-registration command.

If MRDP_MBSC receives a command from the macro-diversity region control module core 308 function to resume the Operating State 1103 (E.g. MRDP_MBSC.Resume command) the MRDP_MBSC may issue a command to activate the resume procedure. (E.g. ResumeProc.Activate command). If MRDP_MBSC receives an indication from the macro-diversity region control module core 308 that the resume procedure has been completed (E.g. ResumeProc.Complete command) the MRDP_MBSC may issue an indication that the MRDP_MBSC is operating (E.g. MRDP_MBSC. Operating indication). The MRDP_MBSC then transitions from the Suspended State 1104 to the Operating State 1103. If MRDP_MBSC receives a de-registration command from macro-diversity region control module core 308 (E.g. MRDP_MBSC.DeRegister command), the MRDP_MBSC may issue a command to activate the de-registration procedure. (E.g. De-RegistrationProc.Activate command). If MRDP_MBSC receives an indication from the macro-diversity region control module core 308 that includes an indication that the de-registration procedure has been completed (E.g. De-RegistrationProc. Complete indication), or an indication that a de-registration procedure has been received (E.g. De-RegistrationProc.Received indication) or an indication that the network connection between the macro-diversity region control module 150 and the ASN-GW failed to be kept alive (E.g. KeepAliveProc.Failed indication) the MRDP_MBSC may issue a various commands and indications including a command to deactivate the network connection between the macro-diversity region control module 150 and the ASN-GW (E.g. KeepAliveProc. DeActivate command), a command to de-activate the de-registration procedure (E.g. De-RegistrationProc. DeActivate command), a command to de-activate the resume procedure. (E.g. ResumeProc.DeActivate command) and an indication that the MRDP_MBSC is initialized (E.g. MRDP_MBSC.Initialized). The MRDP_MBSC then transitions from the Suspended State 1104 to the Initialized State 1102. In one embodiment the MRDP_MBSC can ignore any other commands or messages in Suspended State 1104 other than the above described command to resume the Operating State 1103 or a command to activate the de-registration procedure.

Similarly, after registration, the MRDP_ASN enters the Operating state 1203 and starts to receive macro-diversity region data. In the Operating State 1203 the MRDP_ASN may issue various commands including a command to activate the procedure that monitors the network connection between the macro-diversity region control module 150 and the ASN-GW (E.g. KeepAliveProc.Activate command) and a command to activate the macro-diversity region data transmission (E.g. MBSDataProc.Activate command). The procedure that monitors the network connection between the macro-diversity region control module 150 and the ASN-GW may be active throughout the duration of the Operating State 1203 and the Suspended State 1204. If the MRDP_ASN receives a de-registration command from ASN-GW (E.g. MRDP_ASN.DeRegister command), the MRDP_ASN may issue a command to activate the data path de-registration procedure. (E.g. De-RegistrationProc.Activate command). If MRDP_ASN receives an indication from the ASN-GW that includes an indication that the de-registration procedure has been completed (E.g. De-RegistrationProc. Complete indication), or an indication that a de-registration procedure has been received (E.g. De-RegistrationProc.Received indication) or an indication that the network connection between the macro-diversity region control module 150 and the ASN-GW failed to be kept alive (E.g. KeepAliveProc.Failed indication) the MRDP_ASN may issue various commands and indications including a command to deactivate the macro-diversity region data procedure (E.g. MBSDataProc.DeActivate command), a command to deactivate the procedure that monitors the network connection between the macro-diversity region control module 150 and the ASN-GW (E.g. KeepAliveProc.DeActivate command), a command to de-activate the de-registration procedure. (E.g. De-RegistrationProc.DeActivate command) and an indication that the MRDP_ASN is initialized (E.g. MRDP_ASN.Initialized). The MRDP_ASN then transitions from the Operating State 1203 to the Initialized State 1202. In one embodiment the MRDP_ASN can ignore any other commands or messages in Operating State 1203 other than the above described command to activate the macro-diversity region data transmission or a command to activate the data path de-registration procedure.

If MRDP_ASN receives a command from the ASN-GW to suspend the Operation State 1203 (E.g. SuspendProc.Received command) the MRDP_ASN may issue a command to deactivate the macro-diversity region data procedure (E.g. MBSDataProc.DeActivate command) and an indication to suspend the MRDP_ASN (E.g. MRDP_MBSC.Suspended indication). The MRDP_ASN then transitions from the Operating State 1203 to the Suspended State 1204 where the macro-diversity region data transmission is suspended. The Suspend State may be entered because at certain periods of time (e.g. at night) no content data is broadcast so the ASN-GW is instructed no to expect MBS traffic. If MRDP_ASN receives an indication that the macro-diversity region data procedure is in error (E.g. MBSDataProc.Error) the MRDP_ASN may issue an error warning indication (E.g. MRDP_ASN.MBSDataError) to the ASN-GW.

In one embodiment if the MRDP_ASN is in the Suspended state 1204 and receives a resume procedure indication (E.g. ResumeProc.Received indication) the MRDP_ASN may issue an indication that the MRDP_ASN is operating (E.g. MRDP_ASN. Operating indication). The MRDP_ASN then transitions from the Suspended State 1204 to the Operating State 1203. If MRDP_ASN receives an indication that the de-registration procedure has been completed (E.g. De-RegistrationProc. Complete indication), or an indication that a de-registration procedure has been received (E.g. De-RegistrationProc.Received indication) or an indication that the network connection between the macro-diversity region control module 150 and the ASN-GW failed to be kept alive (E.g. KeepAliveProc.Failed indication) the MRDP_ASN may issue a various commands and indications including a command to deactivate the procedure that monitors the network connection between the macro-diversity region control module 150 and the ASN-GW (E.g. KeepAliveProc, DeActivate command), a command to de-activate the de-registration procedure. (E.g. De-RegistrationProc.DeActivate command), a command to de-activate the resume procedure. (E.g. ResumeProc.DeActivate command) and an indication that the MRDP_MBSC is initialized (E.g. MRDP_ASN.Initialized). The MRDP_ASN then transitions from the Suspended State 1204 to the Initialized State 1202. In one embodiment the MRDP_MBSC can ignore any other commands or messages in Suspended State 1204 other than the above described resume procedure message.

Figure 7:
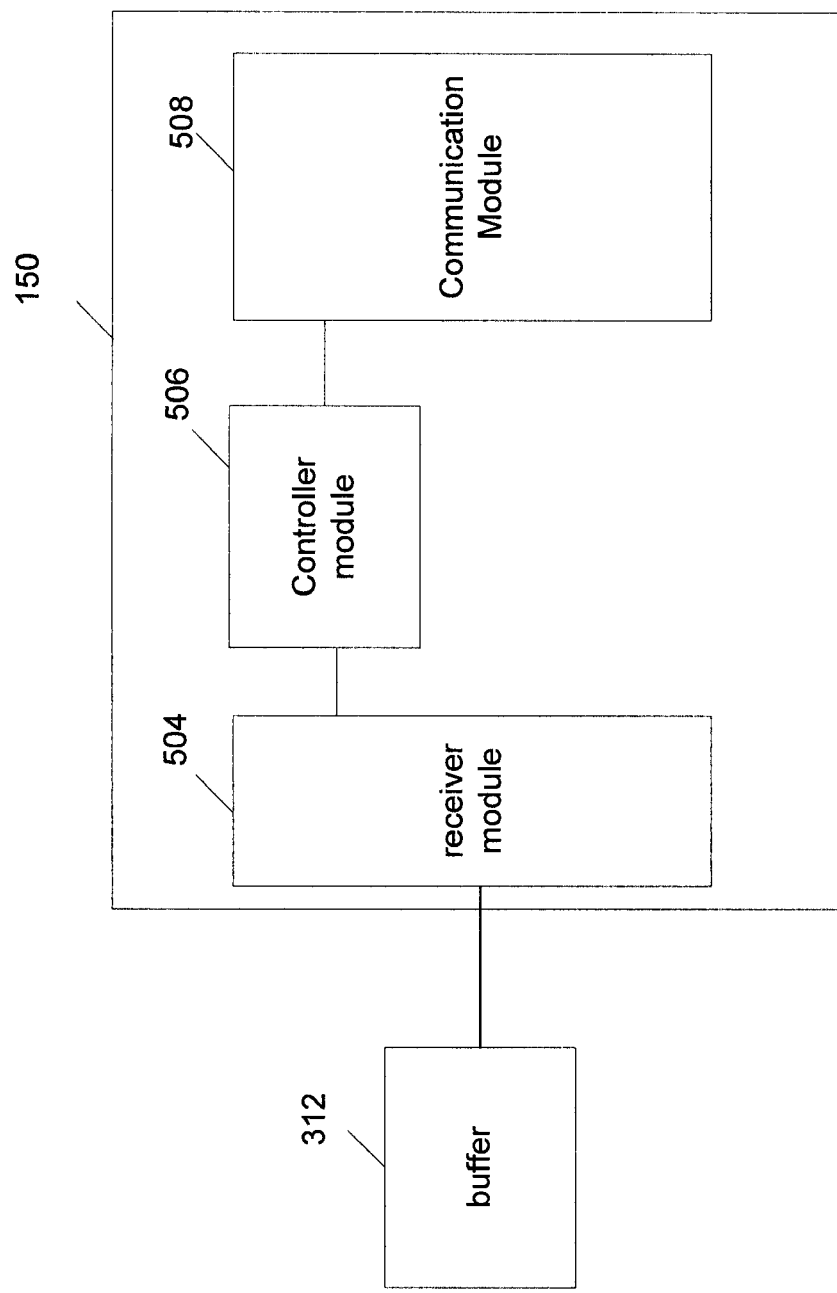
FIG. 7 is an alternative example of a macro-diversity region control module in accordance with an embodiment.

FIG. 7 is an example of a macro-diversity region control module 150 illustrated in FIG. 1 in accordance with an embodiment. For explanatory purposes, FIG. 7 will be discussed with reference to the above-discussed FIG. 1. Also FIG. 7 is an alternative embodiment of the macro-diversity region control module 150 of FIG. 3. Note that FIG. 3 is focused on the data sets that control the behavior of the macro-diversity region control module 150. As illustrated, the macro-diversity region control module 150 may have a buffer 312 described in reference to FIG. 3 above that may be a part of the macro-diversity region control module 150 or external to but coupled to the macro-diversity region control module 150. The macro-diversity region control module 150 may also include a receiving module 504, a controller module 506 and a communication module 508. The receiving module may be coupled to the controller module 506 and configured to receive a plurality of packets of content data from the buffer 312. The plurality of packets of content data may originate from an ASP 160 of FIG. 1.

In one embodiment, the controller module 506 may be configured to generate macro-diversity region data that includes at least one packet of the plurality of packets of content data. The controller module 506 may also generate macro-diversity region control information including time reference and frame offset information. Using a frame offset is advantageous because the base stations may use different numbering schemes for numbering frames. For example an old base station may be up to frame number 1023000 while a new base station may start using frame number 1. The macro-diversity region control information may be configured to enable synchronization of the transmission of the macro-diversity region data by the plurality of base stations. The control information may indicate an offset from the time reference to further indicate a base station transmission frame that will include the macro-diversity region data at a plurality of base stations. In some embodiments the control information may include a modulation and coding scheme selection information to use in transmitting the macro-diversity region at the base stations. In other embodiments the control information may also include zone switch parameters where the zone switch parameters refer to parameters that determine the location and characteristics of the macro-diversity region in a frame, for example, the base station transmission frame. An example of a zone switch parameter includes a symbol offset to indicate an offset from the start of the base station transmission frame to identify a location for the macro-diversity region data in the base station transmission frame. The macro-diversity region control module may use a configuration file (described above) to indicate the zone switch parameters. In some embodiments the control information including the modulation and coding scheme and the zone switch parameters may be configured to ensure that the macro-diversity region is broadcast by each of the base stations using a common waveform.

In one embodiment the time reference may be expressed in coordinated universal time (UTC). The macro-diversity region control module may include a global positioning system (GPS) receiver to receive information, for example information related to time, from a global positioning system. In some embodiments the time related information may be used to generate the time reference. The macro-diversity region control information may include a symbol offset to indicate an offset from the start of the base station transmission frame to identify a location for the macro-diversity region data in the base station transmission frame. The communication module 508 may be coupled to the controller module 506, to communicate a macro-diversity region message that includes the macro-diversity region data and the macro-diversity region control information to a plurality of base stations. In one embodiment the communication module 508 may include the MRDP interface described above in reference to FIG. 4. In one embodiment, the controller module 506 may also be configured to determine the size of the macro-diversity region data, the location of the macro-diversity region, an allocation of content data to be broadcast in the macro-diversity region and to determine a broadcast map detailing the structure of the macro-diversity region data.

Figure 8:
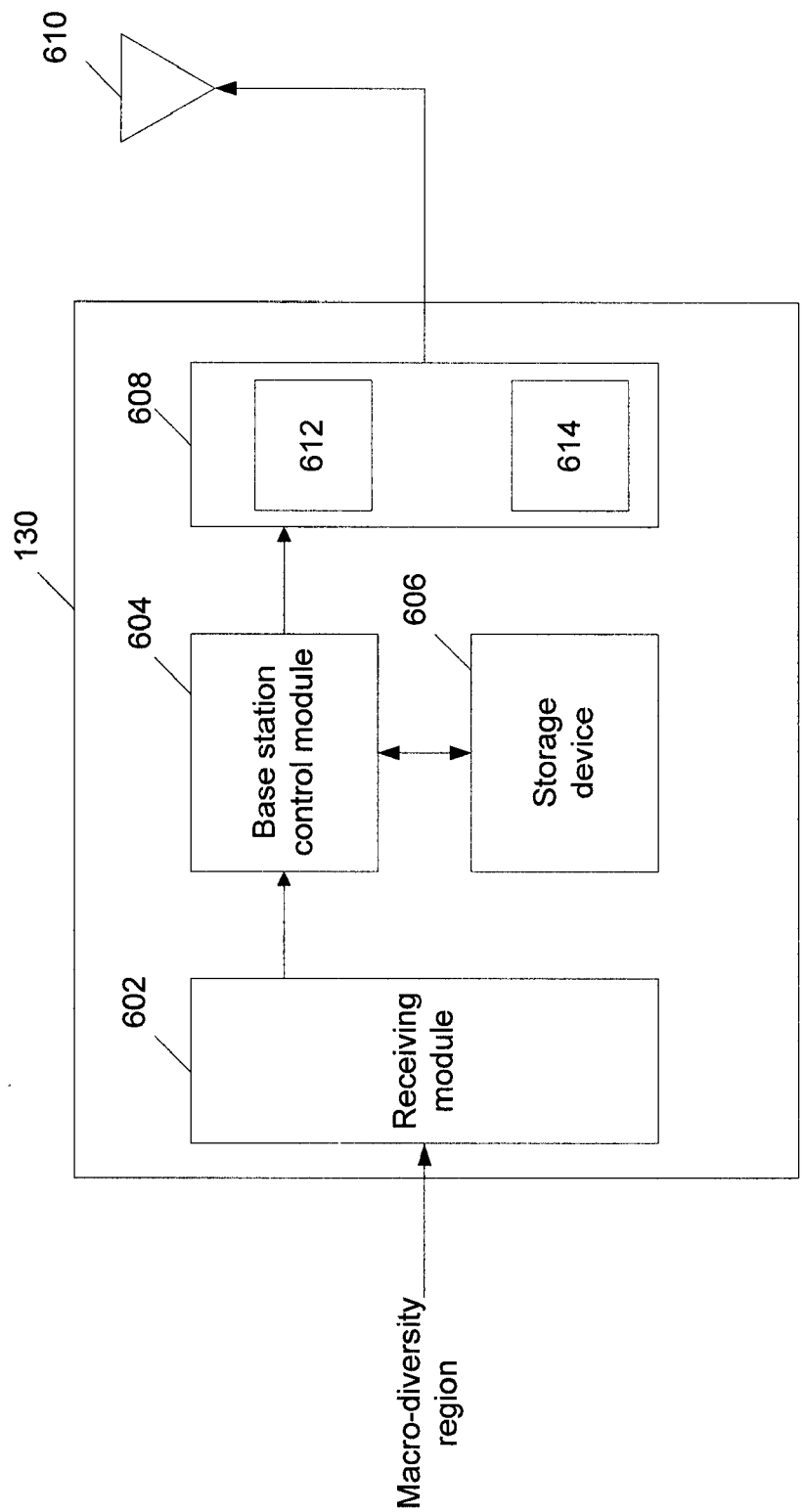
FIG. 8 is a block diagram illustrating a simplified exemplary embodiment of a base station.

FIG. 8 is a block diagram illustrating a simplified exemplary embodiment of a base station 130 illustrated in FIG. 1 in accordance with an embodiment. For explanatory purposes, FIG. 8 will be discussed with reference to the above-discussed FIG. 1. As illustrated, base station 130 may include an interface module 602, a base station control module 604, a storage device 606, a transceiver 608, and an antenna 610. The transceiver 608 may include a receiving module 612 and a transmitting module 614. The Antenna 610 may be coupled to the transceiver 608 and may be configured to receive and send data wirelessly. In some embodiments the receiving module 612 and the transmitting module 614 are independent entities. The interface module 602 may be coupled to the base station control module 604 and may include hardware and/or software for receiving content data, such as for example, a macro-diversity region defined by the macro-diversity region control module 150 described above, and building a data frame including the received macro-diversity region. Transceiver 608 may include hardware and/or software for transmitting and/or receiving data, such as, for example, the built data frames, which may include MAC management messages, content data, etc.

In one embodiment the receiving module 602 may be configured to receive a macro-diversity region message that includes macro-diversity region data having at least one packet of content data and macro diversity region control information from a central entity such as a macro-diversity region control module 150. In some embodiments, the transmitting module 614 may be configured to transmit the base station transmission frame in synchronization with the transmission of the base station transmission frames of other base stations in the network in response to at least a portion of the macro-diversity region control information received by each of the base stations. In one embodiment the base stations 130 receives UTC time from a global positioning system. (GPS).

The base station control module 604 may be coupled to the transceiver 608 and may be configured for building a data frame comprising a downlink region and macro-diversity region, such as macro-diversity region 240 and map 242 that were discussed above with reference to FIG. 2. The base station control module 604 may further be configured for managing the synchronous transmission of the macro-diversity region by the base station 130 such that the macro-diversity regions transmitted by the base stations 130 in the network 100 are synchronously transmitted by the base stations 130.

The storage device 606 may be coupled to the base station control module 604 to store data received at the base station 130. Storage 606 may include volatile and/or non-volatile storage, for example, read only memory (ROM), non-volatile random access memory (NVRAM), etc. along with one or more volatile storage devices, such as, random access memory (RAM). Storage 606 may be used to store, for example, information for use by the base station control module 604 in building the data frames.

Figure 9:
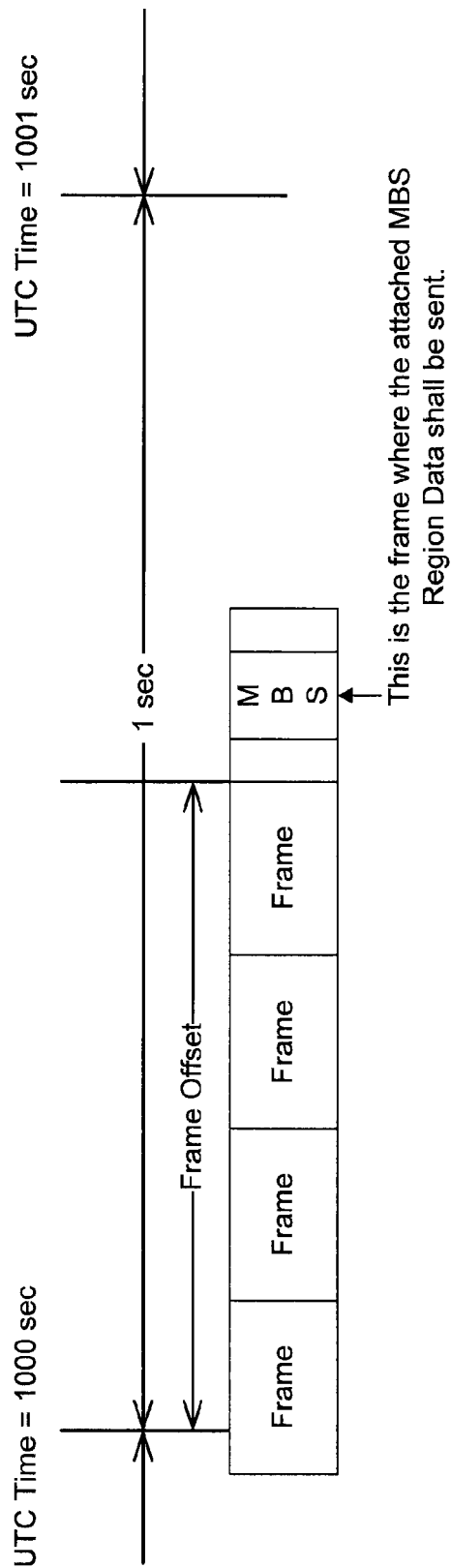
FIG. 9 is an illustration of base station synchronization using a time reference and a frame offset in accordance with an embodiment.

FIG. 9 is an example illustration of base station synchronization using a time reference and frame offset. To achieve macro diversity, the macro-diversity region and it's parameters should be synchronized across all the base stations 130 within a SFN, for example. To achieve this synchronization, macro-diversity region control information (control information) about macro-diversity region parameters may be distributed to all the base stations from a central entity, such as the macro-diversity region control module 150. The control information that is generated by the macro-diversity region control module 150 may include time reference and frame offset information to indicate an offset from the time reference and to further indicate a base station transmission frame that will include a macro-diversity region data. The macro-diversity region data may be included in a macro-diversity region frame generated by the macro-diversity region control module 150. The macro-diversity region frame is built in the macro-diversity region control module core 308.

Each macro-diversity region frame is time-stamped by the MBS core before being sent to the MRDP-MBSC and subsequently to a plurality of base stations 130. In one embodiment the time stamp of each macro-diversity frame includes a time reference and a frame offset from the time reference. The frame offset can be expressed as a number of frames after (or before) the time reference. Thus the combination of the time reference and the frame offset of each macro-diversity frame identifies the base station transmission frame that will include the macro-diversity region data for each of the base stations 130. In one embodiment the time reference is expressed as a UTC time. The macro-diversity region control module 150 or MBS Controller (MBSC) may obtain the UTC time from a GPS driven Network Time Protocol (NTP) Server, for example. The timestamp may be 32 bit number, for example, and may specify the time in seconds. In some embodiments the timestamp may be a 64 bit number including 32 bits specifying the seconds and the other 32 bits specify the fraction of the second. For example, if the time is 1000 seconds with a frame offset of 4, the base station transmission frame is the fourth frame that occurs after the time of 1000 sec.

In one embodiment the macro-diversity region control module 150 may be part of, for example, the ASN Gateway 120, or a Network Manager, or other entity. The choice of the entity on which this functionality resides may vary depending on, for example the infrastructure vendor. In addition, the functionality may be distributed across multiple entities.

Figure 10:
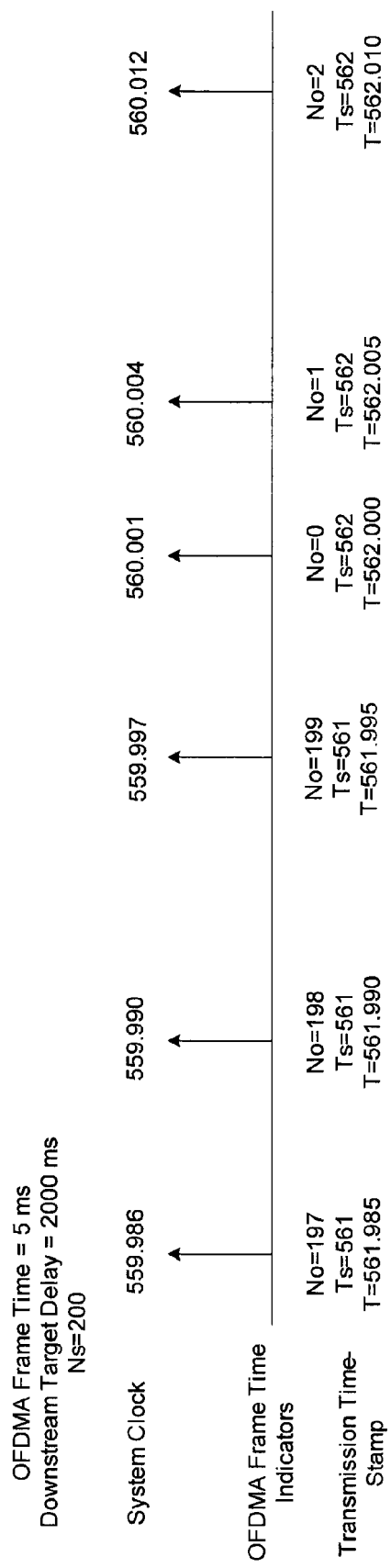
FIG. 10 is one example illustration of the relationship of a time reference, frame offset information and system clock in accordance with an embodiment.

FIG. 10 is one example illustration of the relationship of a time reference, frame offset information and system clock according to an embodiment. Each macro-diversity region frame generated by the macro-diversity region control module 150 may be time-stamped before being sent to MRDP-MBSC. The time-stamp of each frame will indicate the actual time the base station transmission frame from each base station receiving the macro-diversity region frame will be transmitted over the air. The time-stamps may include a time reference, for example, UTC time in seconds and a frame offset from the UTC time. The total number of frames in each second $N_s$ may be computed using:

$$N_s = \frac{1,000}{\text{frame time}},$$

where the frame time in milliseconds may be specified in the active profile. The time-stamping process may maintain its accuracy by an NTP system, for example, keeping track of the UTC time by measuring and adjusting for the time drift as a result of a mismatch of the frequency of the local oscillator of the macro-diversity region control module 150. Referring back to FIGS. 1 and 3 the NTP system may be executed by the macro-diversity region control module core 308 as well as on each base station 130.

The time stamping procedure may be initiated, for example, when the first frame built by the macro-diversity region control module 150 is ready for delivery to MRDP-MBSC. The macro-diversity region control module 150 reads the UTC, for example, that may include a "seconds" portion and a "fraction of a second" portion. In some embodiments, downstream target delay may be added to this time. The resulting time may be specified in the time-stamp format, for example, the "seconds" portion may form the "seconds" portion of the time-stamp which may be referred to as the time reference and the "fraction of seconds" portion may be converted to frame offset by $$N_o = \left\lfloor \frac{1,000 \times \text{fraction of second}}{\text{frame time}} \right\rfloor,$$

where frame time is in milliseconds and $N_0$ is a frame indicator.

The macro-diversity region control module 150 may generate a frame indicator for every frame time. Note that all frame indicators are not necessarily accompanied with a macro-diversity region frame. However the frame time may have some jitter due to the fact that the macro-diversity region control module 150 performs other tasks as well as scheduling the frames. In one embodiment, every time that a frame indicator is generated, a time stamp counter, for example, advances by one until $N_o = N_s - 1$ after which the next indicator $N_o$ will be set to zero and the seconds part of the time stamp increments by one. Assuming that the frame time is 5 milliseconds and hence $N_s = 200$ and that the system time at the beginning is 559.986 and the downstream target delay is 2000 ms. Hence the estimate of transmission time is 561.986 and the transmission time stamp will be $T_s = 561$ and the fraction time of 0.986 translates to frame offset $N_o = 197$ at the beginning of the process. This translates to actual transmission time of $T=T=561.985$. The next frame indicator will have $N_o = 198$ and the third will have $N_o = 199$. The fourth Frame indicator will have a transmission time stamp $T_s = 562$ and $N_o$ will reset to $N_o = 0$.

The incrementing of the frame indicator may be performed even if the macro-diversity region in a frame is empty. The macro-diversity region control module 150 may measure the difference between the frame transmission time stamp and local system clock on a per frame basis in order to verify that the system clock does not considerably deviate from the UTC time. If this difference deviates by more than a threshold number, for example 5%, an (Time Drift) alarm may be generated. In the example, this difference at the beginning is 1999 ms and by the end of the sixth frame it decreases to 1998 ms.

Figure 11:
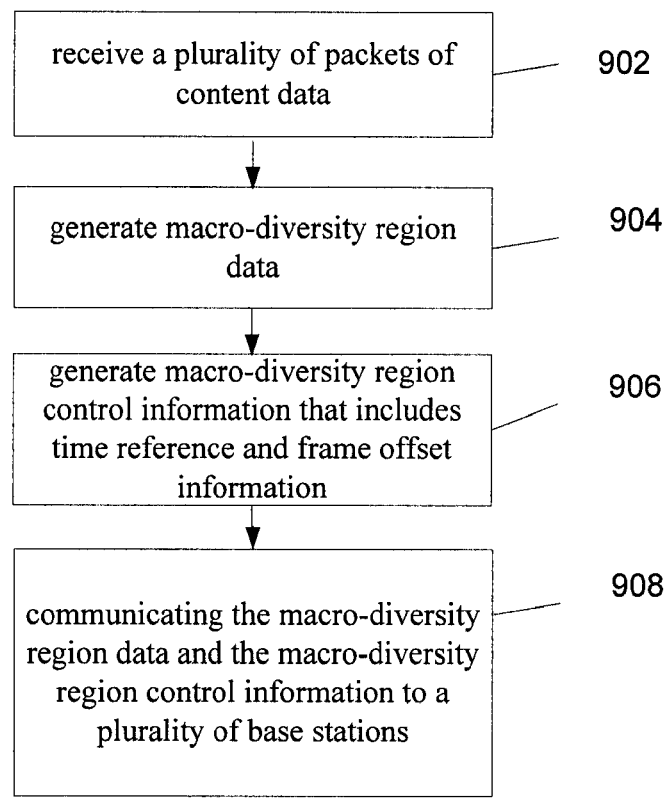
FIG. 11 is an example of a method of synchronizing a macro-diversity region transmitted by a base station in a network in accordance with an embodiment.

FIG. 11 is an example of a method of synchronizing a macro-diversity region transmitted by a base station in a network according to an embodiment. The steps of this method may be implemented in the macro-diversity region control module 150 illustrated in FIG. 1. At step 902 the procedure starts with receiving a plurality of packets of content data such as ASP 160 of FIG. 1. Content providers or content sources may provide the packets of content data. The content distributed by the content providers may be various forms of audio, video, multimedia and other forms of content including audio/video streams, motion picture expert group-2 (MPEG-2), MPEG-4, windows media video (WMV) etc. In step 904 macro-diversity region data is generated at the macro-diversity region control module, for example. The macro-diversity region data may include at least one packet of the plurality of packets of content data received.

The process then continues to step 906 where macro-diversity region control information is generated. The macro-diversity region control information may include a time reference and frame offset information to indicate an offset from the time reference and to further indicate a base station transmission frame that will include the macro-diversity region data at the plurality of base stations. The time reference information may be expressed in UTC time and may be received from a NTP system as described above with reference to FIG. 10. The time reference and the frame offset information are configured to periodically synchronize the transmission of the macro diversity region data at the plurality of base stations.

Finally, in step 908, a macro-diversity region message that includes the macro-diversity region data and the macro-diversity region control information is communicated to a plurality of base stations as was described above with reference to FIG. 8. The macro-diversity region control information may also include a symbol offset to indicate an offset from the start of the base station transmission frame to identify the location for the macro-diversity region data in the base station transmission frame.

Figure 12:
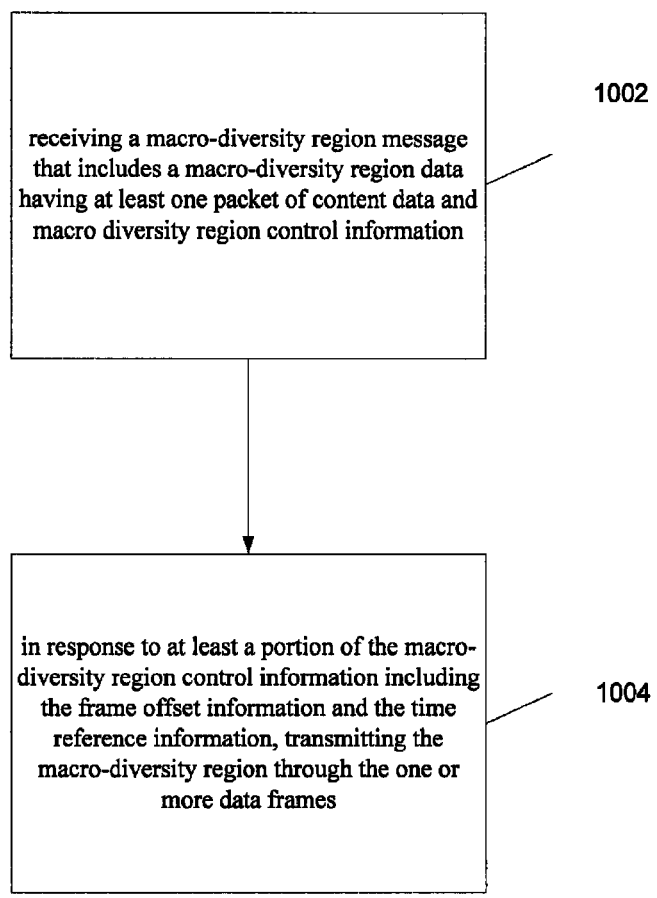
FIG. 12 is an example of a method of synchronizing a macro-diversity region transmitted by a base station in a network in accordance with an embodiment.

FIG. 12 is an example method of synchronizing macro-diversity regions transmitted by the plurality of base stations in a network according to an embodiment utilizing the methods and processes described above. The steps of this method may be implemented in each of the plurality of base stations 130 illustrated in FIG. 1. In one embodiment the process is implemented by the base station control module 604. At step 1002 the process starts with the base station receiving a macro-diversity region message that includes macro-diversity region data having at least one packet of content data and macro diversity region control information. The macro-diversity region message may originate from a central entity, for example, the macro-diversity region control module 150 described with reference to FIG. 1. The macro-diversity region control information may include a time reference and frame offset information to indicate an offset from the time reference and to further indicate a base station transmission frame that will include the macro-diversity region data as was described above with reference to FIG. 7. The process then continues to step 1004, each of the plurality of base stations transmit in synchronization the macro-diversity region data in the identified base station transmission frame according to the time reference and the frame offset information.

Various implementations of the disclosure are realized in electronic hardware, computer software, or combinations of these technologies. Some implementations include one or more computer programs executed by one or more computing devices. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., interfaces, mice, and keyboards), and one or more output devices (e.g., display consoles and printers).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Various illustrative implementations have been described. However, one of ordinary skill in the art will see that additional implementations are also possible and within the scope of the present disclosure.

Accordingly, the present disclosure is not limited to only those implementations described above. Those of skill in the art will appreciate that the various illustrative modules and method steps described in connection with the above described figures and the implementations disclosed herein may often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the disclosure. In addition, the grouping of functions within a module or step is for ease of description. Specific functions may be moved from one module or step to another without departing from the disclosure.

Moreover, the various illustrative modules and method steps described in connection with the implementations disclosed herein may be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium including a network storage medium. An exemplary storage medium may be coupled to the processor such that the processor may read information from, and write information to, the storage medium. In the alternative, the storage medium may be integral to the processor. The processor and the storage medium may also reside in an ASIC.

The above description of the disclosed implementations is provided to enable any person skilled in the art to make or use the the subject matter disclosed. Various modifications to these implementations will be readily apparent to those skilled in the art, and the generic principles described herein may be applied to other implementations without departing from the spirit or scope of the disclosure. Thus, it is to be understood that the description and drawings presented herein represent example implementations and are therefore representative of the subject matter which is broadly contemplated by the present disclosure. It is further understood that the scope of the present disclosure fully encompasses other implementations and that the scope of the present disclosure is accordingly limited by nothing other than the appended claims.

The invention claimed is:

1. A method of broadcasting data from a base station of a wireless communication system comprising a plurality of base stations configured for synchronous transmission, the method comprising:
receiving, at the base station, a macro-diversity region message that includes:
macro-diversity region data having at least one packet of content data,
a time reference, and
a frame offset;
determining a frame from a plurality of frames based on the frame offset and the time reference;
including the macro-diversity region data into the determined frame; and
transmitting, in synchronization with the plurality of base stations, the determined frame including the macro-diversity region data.

2. The method of claim 1, further comprising:
receiving, at the base station, an indication of a modulation and coding scheme to be used in transmitting the macro-diversity region data in the determined frame.

3. The method of claim 1, further comprising:
receiving timing information from a global positioning system.

4. The method of claim 1, further comprising:
receiving, at the base station, a symbol offset,
wherein the inserting the macro-diversity region data into the determined frame includes inserting the macro-diversity region data into the determined frame based on the symbol offset.

5. A base station in a network including a plurality of base stations for synchronous macro-diversity transmission, the base station comprising:
a receiving module configured to receive a macro-diversity region message having at least one packet of macro-diversity region data, a time reference, and a frame offset;
a control module configured to determine a frame from a plurality of frames based on the frame offset and the time reference, and to insert the at least one packet of macro-diversity region data into the determined frame; and
a transmitting module configured to transmit, in synchronization with the plurality of base stations, the determined frame including the at least one packet of macro-diversity region data.

6. The base station of claim 5, wherein the receiving module is configured to receive an indication of a modulation and coding scheme associated with the macro-diversity region data, and the transmitting module is configured to transmit the at least one packet of macro-diversity region data in the determined frame according to the indicated modulation and coding scheme.

7. The base station of claim 5, further comprising:
a timing module configured to receive signals from a global positioning system.

8. The base station of claim 5, wherein the receiving module is configured to receive a symbol offset, and the control module is configured to insert the at least one packet of macro-diversity region data into the determined frame based on the symbol offset.

9. A system for synchronous transmission of a macro-diversity region by a plurality of base stations, the system comprising:
a first base station comprising:
a first receiving module configured to receive macro-diversity region data, a time reference, and a frame offset;
a first control module configured to determine a frame from a plurality of frames based on the frame offset and the time reference, and to insert the macro-diversity region data into the determined frame; and
a first transmitting module configured to transmit the determined frame including the macro-diversity region data; and
a second base station comprising:
a second receiving module configured to receive the macro-diversity region data, the time reference, and the frame offset;
a second control module configured to determine a second frame from a plurality of second frames based on the frame offset and the time reference, and to insert the macro-diversity region data into the determined second frame; and
a second transmitting module configured to transmit the determined second frame including the macro-diversity region data.

10. The system of claim 9, wherein the first and second receiving modules are configured to receive an indication of a modulation and coding scheme to be used by the first base station and second base station in transmitting the macro-diversity region data in the first determined frame and the second determined frame.

11. The system of claim 9, wherein the first base station and the second base station each receives timing information from a global positioning system.

12. The system of claim 9, wherein the first receiving module of the first base station and the second receiving module of the second base station are each configured to receive a symbol offset, and the first control module of the first base station and the second control module of the second base station are each configured to insert the macro-diversity region data into the determined first frame and the determined second frame, respectively, based on the symbol offset.

13. The system of claim 9, further comprising:
a central entity configured to transmit the macro-diversity region data, the time reference, and the frame offset to the first receiving module of the first base station and the second receiving module of the second base station.

14. The system of claim 13, wherein the central entity is a macro-diversity region control module.

15. A base station comprising:
a receiving module configured to receive macro-diversity region data, a time reference, and a frame offset;
a control module configured to determine a downlink frame from a plurality of frames based on the frame offset and the time reference, and to insert the macro-diversity region data into the downlink frame; and
a transmitting module configured to transmit the downlink frame including the macro-diversity region data synchronously with a plurality of base stations.

16. The base station of claim 15, wherein the receiving module is configured to receive an indication of a modulation and coding scheme associated with the macro-diversity region data.

17. The base station of claim 15, wherein the control module is further configured to receive timing information from a global positioning system, and to determine the downlink frame from the plurality of frames also on the timing information from the global positioning system.

18. The base station of claim 15, wherein the receiving module is configured to receive a symbol offset, and the control module is further configured to insert the macro-diversity region data into the downlink frame based on the symbol offset.

19. The base station of claim 15, wherein the receiving module is configured to receive the macro-diversity region data, the time reference, and the frame offset from a central entity.

20. The base station of claim 19, wherein the central entity is a macro-diversity region control module.

* * * * *